US012526732B2

(12) United States Patent
Sun et al.

(10) Patent No.: US 12,526,732 B2
(45) Date of Patent: Jan. 13, 2026

(54) METHOD FOR PROVIDING NETWORK SLICE, AND COMMUNICATION APPARATUS

(71) Applicant: HUAWEI TECHNOLOGIES CO., LTD., Guangdong (CN)

(72) Inventors: Fei Sun, Shanghai (CN); Haiyan Luo, Shenzhen (CN); Qinghai Zeng, Shanghai (CN); Mingzeng Dai, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 651 days.

(21) Appl. No.: 17/892,577

(22) Filed: Aug. 22, 2022

(65) Prior Publication Data

US 2022/0394604 A1 Dec. 8, 2022

Related U.S. Application Data

(63) Continuation of application No. PCT/CN2020/076572, filed on Feb. 25, 2020.

(51) Int. Cl.
*H04W 48/16* (2009.01)
*H04W 36/00* (2009.01)
(Continued)

(52) U.S. Cl.
CPC ....... *H04W 48/16* (2013.01); *H04W 36/0085* (2018.08); *H04W 48/08* (2013.01); *H04W 48/18* (2013.01); *H04W 76/10* (2018.02)

(58) Field of Classification Search
CPC . H04W 48/16; H04W 36/0085; H04W 48/08; H04W 48/18; H04W 76/10; H04W 76/12
See application file for complete search history.

(56) References Cited

U.S. PATENT DOCUMENTS

2018/0288654 A1* 10/2018 Shih .................. H04W 48/14
2018/0324602 A1* 11/2018 Griot ................. H04W 48/20
(Continued)

FOREIGN PATENT DOCUMENTS

CN 108347751 A 7/2018
CN 109862579 A 6/2019
(Continued)

OTHER PUBLICATIONS

3GPP TS 24.501 V16.3.0 (Dec. 2019), "3rd Generation Partnership Project; Technical Specification Group Core Network and Terminals; Non-Access-Stratum (NAS) protocol for 5G System (5GS); Stage 3 (Release 16)," Dec. 2019, 644 pages.
(Continued)

*Primary Examiner* — Gary Mui
(74) *Attorney, Agent, or Firm* — Fish & Richardson P.C.

(57) ABSTRACT

The present disclosure relates to methods and communication apparatus for providing a network slice. In one example method where an access network device accessed by a terminal device does not support a network slice requested by the terminal device, the terminal device sends a network slice identifier, corresponding to a protocol data unit (PDU) session, to the access network device by including the network slice identifier in an radio resource control (RRC) message. The access network device may learn of the network slice identifier, and when the access network device does not support the network slice, search, in an access network device corresponding to a neighboring cell, for a target second access network device that supports the network slice.

20 Claims, 13 Drawing Sheets

(51) Int. Cl.
*H04W 48/08* (2009.01)
*H04W 48/18* (2009.01)
*H04W 76/10* (2018.01)

(56) References Cited

U.S. PATENT DOCUMENTS

| | | | |
|---|---|---|---|
| 2019/0320314 A1* | 10/2019 | Yang | H04W 40/12 |
| 2019/0349774 A1* | 11/2019 | Lou | H04W 36/13 |
| 2019/0349838 A1* | 11/2019 | Futaki | H04W 48/08 |
| 2020/0107378 A1* | 4/2020 | Velev | H04W 48/08 |
| 2021/0037426 A1* | 2/2021 | Zhu | H04W 76/12 |
| 2021/0153088 A1* | 5/2021 | Jin | H04W 36/0085 |
| 2021/0160936 A1* | 5/2021 | Yang | H04W 76/12 |
| 2022/0360996 A1* | 11/2022 | Luo | H04W 16/10 |
| 2023/0074413 A1* | 3/2023 | Chun | H04W 60/00 |

FOREIGN PATENT DOCUMENTS

| | | |
|---|---|---|
| CN | 110035461 A | 7/2019 |
| CN | 110463335 A | 11/2019 |
| CN | 110679179 A | 1/2020 |
| CN | 110769458 A | 2/2020 |
| WO | 2019192896 A1 | 10/2019 |

OTHER PUBLICATIONS

PCT International Search Report and Written Opinion issued in International Application No. PCT/CN2020/076572 on Nov. 30, 2020, 11 pages (partial English translation).
ZTE Corporation, Sanechips, "Signalling of slice information," 3GPP TSG RAN WG2 Meeting #101, R2-1802034, Athens, Greece, Feb. 26-Mar. 2, 2018, 6 pages.
Office Action in Chinese Appln. No. 202080096957.4, dated Apr. 22, 2023, 12 pages.

* cited by examiner

METHOD FOR PROVIDING NETWORK SLICE, AND COMMUNICATION APPARATUS

CROSS-REFERENCE TO RELATED APPLICATIONS

This application is a continuation of International Application No. PCT/CN2020/076572, filed on Feb. 25, 2020, the disclosure of which is hereby incorporated by reference in its entirety.

TECHNICAL FIELD

This application relates to the field of wireless communication technologies, and more specifically, to a method for providing a network slice and a communication apparatus.

BACKGROUND

With development of mobile communication technologies, various new services and application scenarios continuously emerge, and requirements of these services for network functions, connection performance, security, and the like differ greatly. If a single network is used to carry these services, it is difficult to meet requirements for high bandwidth, low latency, high reliability, and the like at the same time. However, building a new network for each type of service brings huge costs. This requires a communication system to be flexible and scalable, and to meet different service requirements.

In this background, for a 5th generation (5G) communication system, end-to-end network slicing is proposed to provide users with customized network services. Through flexible allocation of network resources and on-demand networking, a plurality of isolated logical subnets with different features are virtualized on a same set of physical settings, to provide users with targeted services. Different logical subnets may be identified and distinguished by using pieces of single network slice selection assistance information (S-NSSAI).

However, in some cases, a network slice requested by user equipment (UE) is not supported by a radio access network (RAN). Consequently, a service requirement of the UE cannot be met.

SUMMARY

This application provides a method for providing a network slice and a communication apparatus, to meet a service requirement of UE.

According to a first aspect, a method for providing a network slice is provided. The method includes: A terminal device sends a first radio resource control (RRC) message to a first access network device, where the first RRC message includes a NAS message and a network slice identifier, the NAS message is for requesting to establish a protocol data unit (PDU) session, and the network slice identifier is for identifying a network slice corresponding to the PDU session. The terminal device receives a second RRC message from the first access network device, where the second RRC message carries information about a target second access network device, the target second access network device supports the network slice, and a cell corresponding to the target second access network device is a neighboring cell of the first access network device. The terminal device accesses the target second access network device.

The terminal device sends the network slice identifier corresponding to the PDU session to the access network device by including the network slice identifier in the RRC message, so that the access network device may learn of the network slice identifier, and when the access network device does not support the network slice, search, in an access network device corresponding to a neighboring cell, for the target second access network device that supports the network slice. Therefore, a network slice service is provided for the terminal device in a DC manner, and a service requirement of the UE can be met.

With reference to the first aspect, in some implementations of the first aspect, before the terminal device sends the first RRC message to the first access network device, the method further includes: An access stratum (AS) of the terminal device obtains information about a network slice supported by the first access network device. The AS of the terminal device sends, to a non-access stratum (NAS) of the terminal device, the information about the network slice supported by the first access network device. The NAS of the terminal device sends the NAS message and the network slice identifier to the AS when the NAS of the terminal device determines that the network slice belongs to an allowed network slice and that the network slice is not supported by the first access network device.

Through interaction between the NAS and the AS of the terminal device, the AS may notify the access network device of an identifier of the network slice corresponding to the PDU session, so that the access network device may determine in advance whether the access network device and the neighboring cell support the network slice, to notify a core network device when forwarding a PDU session request message to the core network device. Therefore, unnecessary signaling transmission can be avoided.

With reference to the first aspect, in some implementations of the first aspect, before the terminal device sends the first RRC message to the first access network device, the method further includes: A NAS of the terminal device sends the network slice identifier to an AS when the network slice belongs to an allowed network slice. The AS of the terminal device obtains information about a network slice supported by the first access network device, and determines that the network slice corresponding to the PDU session is not supported by the first access network device.

Through interaction between the NAS and the AS of the terminal device, the AS may notify the access network device of an identifier of the network slice corresponding to the PDU session, so that the access network device may determine in advance whether the access network device and the neighboring cell support the network slice, to notify a core network device when forwarding a PDU session request message to the core network device. Therefore, unnecessary signaling transmission can be avoided.

With reference to the first aspect, in some implementations of the first aspect, before the terminal device sends the first RRC message to the first access network device, the method further includes: An AS of the terminal device obtains, from the first access network device, information about a network slice supported by the first access network device. The AS of the terminal device receives, from a NAS, the network slice identifier and information about an allowed network slice, where the network slice identifier is for identifying the network slice corresponding to the PDU session initiated by the NAS. The AS of the terminal device determines that the network slice corresponding to the PDU session belongs to the allowed network slice and that the network slice corresponding to the PDU session is not supported by the first access network device.

Through interaction between the NAS and the AS of the terminal device, the AS may notify the access network device of an identifier of the network slice corresponding to the PDU session, so that the access network device may determine in advance whether the access network device and the neighboring cell support the network slice, to notify a core network device when forwarding a PDU session request message to the core network device. Therefore, unnecessary signaling transmission can be avoided.

With reference to the first aspect, in some implementations of the first aspect, before the terminal device sends the first RRC message to the first access network device, the method further includes: A NAS of the terminal device sends the NAS message and the network slice identifier to an AS of the terminal device. In addition, that a terminal device sends a first RRC message to a first access network device includes: The AS of the terminal device sends the first RRC message to the first access network device.

Through interaction between the NAS and the AS of the terminal device, the AS may notify the access network device of an identifier of the network slice corresponding to the PDU session, so that the access network device may determine in advance whether the access network device and the neighboring cell support the network slice, to notify a core network device when forwarding a PDU session request message to the core network device. Therefore, unnecessary signaling transmission can be avoided.

With reference to the first aspect, in some implementations of the first aspect, after the terminal device accesses the target second access network device, the method further includes: The AS of the terminal device obtains information about a network slice supported by the target second access network device. The AS of the terminal device sends, to the NAS, the information about the network slice supported by the target second access network device.

After the terminal device accesses an SN, the AS obtains information about a network slice supported by the SN, and sends the information about the network slice supported by the SN to the NAS, so that the NAS learns that a PDU session corresponding to the network slice supported by the SN can be initiated. Therefore, network slice performance can be further optimized.

With reference to the first aspect, in some implementations of the first aspect, before the terminal device receives the second RRC message from the first access network device, the method further includes: The AS of the terminal device performs radio resource management (RRM) measurement when determining that the first access network device does not support the network slice corresponding to the PDU session, to obtain a measurement result; or the NAS of the terminal device indicates, w % ben determining that the first access network device does not support the network slice corresponding to the PDU session, the AS to perform RRM measurement, to obtain a measurement result, where the measurement result includes information about a network slice supported by each neighboring cell of the first access network device; or the AS of the terminal device reports a historical measurement report to the first access network device when determining that the first access network device does not support the network slice corresponding to the PDU session; or the NAS of the terminal device indicates, when determining that the first access network device does not support the network slice corresponding to the PDU session, the AS to report a historical measurement report to the first access network device. The AS of the terminal device sends the measurement result or the historical measurement report to the first access network device.

Optionally, the historical measurement report may be a measurement report that is previously obtained by the terminal device through RRM measurement but not sent to the first access network device.

Through interaction between the NAS and the AS of the terminal device, when it is determined that the first access network device does not support a network slice corresponding to a specific PDU session, the AS is triggered to perform RRM measurement. The AS may determine, based on a historical measurement report or a measurement result obtained through RRM measurement, whether there is a neighboring cell supporting the network slice. When no neighboring cell supports the network slice, the AS notifies the NAS, so that the NAS cancels the PDU session. Therefore, subsequent unnecessary signaling transmission is avoided.

With reference to the first aspect, in some implementations of the first aspect, the method further includes: The terminal device receives a registration complete message from the core network device, where the registration complete message carries first indication information, and the first indication information is for indicating the NAS of the terminal device to send, to the AS when the NAS initiates a PDU session, an identifier of a network slice corresponding to the PDU session.

After registration (for example, an initial registration procedure) of the terminal device is completed, the core network device notifies, to the terminal device by using the registration complete message, that when the NAS of the terminal device initiates a PDU session, the NAS needs to send, to the AS, an identifier of a network slice corresponding to the PDU session. Subsequently, when initiating a PDU session, the NAS of the terminal device sends, to the AS by default, a network slice identifier corresponding to the PDU session, in other words, may send a network slice without determining that the network slice corresponding to the PDU session is not supported by the first access network device. Therefore, signaling interaction between the NAS and the AS can be reduced.

According to a second aspect, a method for providing a network slice is provided. The method includes: A NAS of a terminal device sends a NAS message and a network slice identifier to an AS of the terminal device, where the NAS message is for requesting to establish a PDU session, and the network slice identifier is for identifying a network slice corresponding to the PDU session. The AS of the terminal device performs RRM measurement when determining that a first access network device accessed by the terminal device does not support the network slice corresponding to the PDU session, or the NAS of the terminal device indicates, when determining that a first access network device does not support the network slice corresponding to the PDU session, the AS to perform RRM measurement, to obtain a measurement result, where the measurement result includes information about a network slice supported by each neighboring cell of the first access network device. The AS of the terminal device sends failure indication information to the NAS of the terminal device when determining, based on the measurement result, that no neighboring cell supports the network slice corresponding to the PDU session, where the failure indication information is for indicating that the network slice is not supported. The NAS of the terminal device cancels, based on the failure indication information, initiation of the PDU session.

Through interaction between the NAS and the AS of the terminal device, when it is determined that the first access network device does not support a network slice corresponding to a specific PDU session, the AS is triggered to perform RRM measurement. The AS determines, based on a measurement result obtained through RRM measurement, whether there is a neighboring cell supporting the network slice. When no neighboring cell supports the network slice, the AS notifies the NAS, so that the NAS cancels the PDU session. Therefore, subsequent unnecessary signaling transmission is avoided.

According to a third aspect, this application provides a method for providing a network slice. The method includes: A first access network device receives a first RRC message from a terminal device, where the first RRC message includes a NAS message and a network slice identifier, the NAS message is for requesting to establish a PDU session, and the network slice identifier is for identifying a network slice corresponding to the PDU session. The first access network device sends a first message to a core network device, where the first message carries second indication information, and the second indication information is for indicating that the first access network device does not support the network slice.

The terminal device sends, to the access network device by including the network slice identifier in the RRC message, the network slice identifier corresponding to the PDU session initiated by a NAS, so that the access network device may learn, in advance based on the network slice identifier, whether the access network device supports the network slice, to notify the core network device when forwarding a PDU session establishment request message of the UE to the core network device. Therefore, subsequent unnecessary signaling transmission is avoided.

With reference to the third aspect, in some implementations of the third aspect, the first message further carries information about a target second access network device, the target second access network device supports the network slice, and a cell corresponding to the target second access network device is a neighboring cell of the first access network device.

When the first access network device does not support the network slice corresponding to the PDU session, an access network device corresponding to a neighboring cell that supports the network slice is searched for. If the target second access network device that supports the network slice exists, the first access network device includes the information about the target second access network device in the first message when forwarding the PDU session establishment request message of the UE to a core network, so that the core network device may learn whether the neighboring cell of the first access network device supports the network slice.

With reference to the third aspect, in some implementations of the third aspect, before the first access network device sends the first message to the core network device, the method further includes: The first access network device receives a measurement result from the terminal device, where the measurement result includes information about a network slice supported by each neighboring cell of the first access network device. The first access network device determines, based on the measurement result, that no neighboring cell supports the network slice.

In a possible case, when the first access network device does not support the network slice corresponding to the PDU session initiated by the terminal device, the first access network device determines, based on the information that is from the terminal device and that is about the network slice supported by each neighboring cell, that no neighboring cell supports the network slice corresponding to the PDU session.

With reference to the third aspect, in some implementations of the third aspect, before the first access network device sends the first message to the core network device, the method further includes: The first access network device receives a measurement result from the terminal device, where the measurement result includes information about a network slice supported by each neighboring cell of the first access network device. The first access network device determines, based on the measurement result, that the target second access network device supports the network slice corresponding to the PDU session, where the cell corresponding to the target second access network device is a neighboring cell of the first access network device.

In another possible case, when the first access network device does not support the network slice corresponding to the PDU session initiated by the terminal device, the first access network device determines, based on the information that is from the terminal device and that is about the network slice supported by each neighboring cell, that no neighboring cell supports the network slice corresponding to the PDU session.

According to a fourth aspect, this application provides a method for providing a network slice. The method includes: A core network device receives a first message from a first access network device, where the first message carries second indication information and information about a target second access network device, the first message is for requesting to establish a PDU session, the second indication information is for indicating that the first access network device does not support a network slice corresponding to the PDU session, the target second access network device supports the network slice corresponding to the PDU session, and a cell corresponding to the target second access network device is a neighboring cell of the first access network device. The core network device sends a second message to the first access network device, where the second message includes information about a resource configuration required for establishing the PDU session.

Optionally, the first message may be an NGAP message and/or the second message may be an NGAP message.

When the first access network device does not support the network slice corresponding to the PDU session, an access network device corresponding to a neighboring cell that supports the network slice is searched for. If the target second access network device that supports the network slice exists, the first access network device includes the information about the target second access network device in the first message when forwarding a PDU session establishment request message of UE to a core network, so that the core network device may learn whether the neighboring cell of the first access network device supports the network slice. If the core network device learns that the target second access network device that supports the network slice exists, the core network device provides the first access network device with the information about the resource configuration required for establishing the PDU session, to provide the terminal device with the network slice corresponding to the PDU session.

With reference to the fourth aspect, in some implementations of the fourth aspect, the method further includes: The core network device receives a registration request message from the terminal device, where the registration request message is for requesting to register the terminal device with a core network. The core network device sends a registration complete message to the terminal device, where the registration complete message carries first indication information, and the first indication information is for indicating a NAS of the terminal device to send, to an AS when the NAS initiates a PDU session, an identifier of a network slice corresponding to the PDU session.

After registration of the terminal device is completed, the core network device notifies, to the terminal device by using the registration complete message, that when the NAS of the terminal device initiates a PDU session, the NAS needs to send, to the AS, an identifier of a network slice corresponding to the PDU session. Subsequently, when initiating a PDU session, the NAS of the terminal device sends, to the AS by default, a network slice identifier corresponding to the PDU session, in other words, may send a network slice without determining that the network slice corresponding to the PDU session is not supported by the first access network device. Therefore, signaling interaction between the NAS and the AS can be reduced.

According to a fifth aspect, this application provides a method for providing a network slice. The method includes: A core network device receives a protocol data unit (PDU) session establishment request message from a terminal device, where the PDU session establishment request message carries a network slice identifier, the PDU session establishment request message is for requesting to establish a PDU session, the network slice identifier is for identifying a network slice corresponding to the PDU session, and a first access network device accessed by the terminal device does not support the network slice. The core network device sends first information to the first access network device, where the first information is for indicating one or more second access network devices that support the network slice.

In a scenario in which the access network device accessed by the terminal device does not support the network slice requested by the terminal device, the core network device provides the access network device with information about a neighboring cell that supports the network slice, so that the access network device adds an access network device that supports the network slice as a secondary base station. Therefore, a network slice service is provided for the UE in a DC manner, and network slice performance is improved.

With reference to the fifth aspect, in some implementations of the fifth aspect, before the core network device sends the first information to the first access network device, the method further includes: The core network device determines, based on a network slice supported by the first access network device, that the first access network device does not support the network slice.

According to a sixth aspect, this application provides a method for providing a network slice. The method includes: A first access network device receives first information from a core network device, where the first information is for indicating one or more second access network devices, the one or more second access network devices support a network slice corresponding to a PDU session that a terminal device requests to establish, and the first access network device does not support the network slice. The first access network device selects a target second access network device from the one or more second access network devices based on the first information.

In some implementations of the fifth aspect or the sixth aspect, the first information includes any one or more of the following information about the neighboring cell of the first access network device:

a physical cell identifier (PCI) list, where the PCI list includes one or more PCIs, and a cell corresponding to each PCI supports the network slice;
a cell global identifier (CGI) list, where the CGI list includes one or more CGIs, and a cell corresponding to each CGI supports the network slice;
a PCI list and an identifier of a second access network device associated with each PCI in the PCI list, where the second access network device associated with each PCI supports the network slice;
identifiers of the one or more second access network devices, where each second access network device supports the network slice;
a radio access network area code (RAN AC) list, where a cell corresponding to each RAN AC in the RAN AC list supports the network slice;
a closed access group identifier (CAG ID) list, where a cell corresponding to each CAG ID in the CAG ID list supports the network slice;
a radio access network slice area identifier (RSA ID) list, where a cell corresponding to each RSA ID in the RSA ID list supports the network slice;
carrier information, where the carrier information includes one or more carriers, and each carrier supports the network slice corresponding to the PDU session; or
carrier information and cell information, where the carrier information includes one or more carriers, and each carrier supports the network slice corresponding to the PDU session.

When the first access network device does not support the network slice corresponding to the PDU session that the terminal device requests to establish, the core network device provides the first access network device with the information about the neighboring cell that supports the network slice. The information about the neighboring cell may be at a plurality of granularities, for example, may be information about a carrier, a cell, or an access network. Therefore, flexibility of obtaining the network slice service by the UE is improved.

Optionally, in an implementation, a sequence of PCIs included in the PCI list indicates a priority sequence of cells corresponding to the PCIs in the PCI list; a sequence of CGIs included in the CGI list indicates a priority sequence of cells corresponding to the CGIs in the CGI list;
a sequence of identifiers of second access network devices indicates a priority sequence of the second access network devices;
a sequence of RAN ACs included in the RAN AC list indicates a priority sequence of cells corresponding to the RAN ACs in the RAN AC list;
a sequence of CAG IDs included in the CAG ID list indicates a priority sequence of cells corresponding to the CAG IDs in the CAG ID list;
a sequence of RSA IDs included in the RSA ID list indicates a priority sequence of cells corresponding to the RSA IDs in the RSA ID list; or
a sequence of carriers included in the carrier information indicates a priority sequence of the carriers.

PCIs, CGIs, neighboring cells, base stations, or the like that are provided by the core network device for the first access network device and that support the network slice may have a priority sequence, so that the first access network device may select an SN based on the priority sequence. In this way, the selected SN may provide a better network slice service for the UE, so that network slice performance is improved.

According to a seventh aspect, a communication apparatus is provided. The communication apparatus has a function of implementing the method according to any one of the first aspect or the possible implementations of the first aspect, or has a function of implementing the method according to any one of the sixth aspect or the possible implementations of the sixth aspect. The function may be implemented by using hardware, or may be implemented by hardware executing corresponding software. The hardware or the software includes one or more units corresponding to the foregoing function.

According to an eighth aspect, this application provides a communication apparatus. The communication apparatus has a function of implementing the method according to any one of the second aspect or the possible implementations of the second aspect, or has a function of implementing the method according to any one of the fifth aspect or the possible implementations of the fifth aspect. The function may be implemented by using hardware, or may be implemented by hardware executing corresponding software. The hardware or the software includes one or more units corresponding to the foregoing function.

According to a ninth aspect, this application provides a communication apparatus. The communication apparatus has a function of implementing the method according to any one of the third aspect or the possible implementations of the third aspect, or has a function of implementing the method according to any one of the fourth aspect or the possible implementations of the fourth aspect. The function may be implemented by using hardware, or may be implemented by hardware executing corresponding software. The hardware or the software includes one or more units corresponding to the foregoing function.

According to a tenth aspect, this application provides a core network device, including a processor, a memory, and a transceiver. The memory is configured to store a computer program. The processor is configured to: invoke and run the computer program stored in the memory, and control the transceiver to receive and send signals, so that the core network device performs the method according to any one of the first aspect or the possible implementations of the first aspect, or performs the method according to any one of the sixth aspect or the possible implementations of the sixth aspect.

According to an eleventh aspect, this application provides an access network device, including a processor, a memory, and a transceiver. The memory is configured to store a computer program. The processor is configured to: invoke and run the computer program stored in the memory, and control the transceiver to receive and send signals, so that the access network device performs the method according to any one of the second aspect or the possible implementations of the second aspect, or performs the method according to any one of the fifth aspect or the possible implementations of the fifth aspect.

According to a twelfth aspect, this application provides a terminal device, including a processor, a memory, and a transceiver. The memory is configured to store a computer program. The processor is configured to: invoke and run the computer program stored in the memory, and control the transceiver to receive and send signals, so that the terminal device performs the method according to any one of the third aspect or the possible implementations of the third aspect, or performs the method according to any one of the fourth aspect or the possible implementations of the fourth aspect.

According to a thirteenth aspect, this application provides a computer-readable storage medium. The computer-readable storage medium stores computer instructions. When the computer instructions are run on a computer, the method according to any one of the first aspect or the possible implementations of the first aspect is performed, or the method according to any one of the sixth aspect or the possible implementations of the sixth aspect is performed.

According to a fourteenth aspect, this application provides a computer-readable storage medium. The computer-readable storage medium stores computer instructions. When the computer instructions are run on a computer, the method according to any one of the second aspect or the possible implementations of the second aspect is performed, or the method according to any one of the fifth aspect or the possible implementations of the fifth aspect is performed.

According to a fifteenth aspect, this application provides a computer-readable storage medium. The computer-readable storage medium stores computer instructions. When the computer instructions are run on a computer, the method according to any one of the third aspect or the possible implementations of the third aspect is performed, or the method according to any one of the fourth aspect or the possible implementations of the fourth aspect is performed.

According to a sixteenth aspect, this application provides a computer program product. The computer program product includes computer program code. When the computer program code is run on a computer, the method according to any one of the first aspect or the possible implementations of the first aspect is performed, or the method according to any one of the sixth aspect or the possible implementations of the sixth aspect is performed.

According to a seventeenth aspect, this application provides a computer program product. The computer program product includes computer program code. When the computer program code is run on a computer, the method according to any one of the second aspect or the possible implementations of the second aspect is performed, or the method according to any one of the fifth aspect or the possible implementations of the fifth aspect is performed.

According to an eighteenth aspect, this application provides a computer program product. The computer program product includes computer program code. When the computer program code is run on a computer, the method according to any one of the third aspect or the possible implementations of the third aspect is performed, or the method according to any one of the fourth aspect or the possible implementations of the fourth aspect is performed.

According to a nineteenth aspect, this application provides a chip. The chip includes a processor and a communication interface. The communication interface is configured to receive a signal and transmit the signal to the processor, and the processor processes the signal, so that the method according to any one of the first aspect or the possible implementations of the first aspect is performed, or the method according to any one of the sixth aspect or the possible implementations of the sixth aspect is performed.

According to a twentieth aspect, this application provides a chip. The chip includes a processor and a communication interface. The communication interface is configured to receive a signal and transmit the signal to the processor, and the processor processes the signal, so that the method according to any one of the second aspect or the possible implementations of the second aspect is performed, or the method according to any one of the fifth aspect or the possible implementations of the fifth aspect is performed.

According to a twenty-first aspect, this application provides a chip. The chip includes a processor and a communication interface. The communication interface is configured to receive a signal and transmit the signal to the processor, and the processor processes the signal, so that the method according to any one of the third aspect or the possible implementations of the third aspect is performed, or the method according to any one of the fourth aspect or the possible implementations of the fourth aspect is performed.

According to a twenty-second aspect, this application provides a communication apparatus. The communication apparatus includes a memory and a processor. The memory is configured to store a computer program or instructions, and the processor is configured to read and run the computer program or the instructions stored in the memory, so that the method according to any one of the first aspect or the possible implementations of the first aspect is performed, or the method according to any one of the sixth aspect or the possible implementations of the sixth aspect is performed.

According to a twenty-third aspect, this application provides a communication apparatus. The communication apparatus includes a memory and a processor. The memory is configured to store a computer program or instructions, and the processor is configured to read and run the computer program or the instructions stored in the memory, so that the method according to any one of the second aspect or the possible implementations of the second aspect is performed, or the method according to any one of the fifth aspect or the possible implementations of the fifth aspect is performed.

According to a twenty-fourth aspect, this application provides a communication apparatus. The communication apparatus includes a memory and a processor. The memory is configured to store a computer program or instructions, and the processor is configured to read and run the computer program or the instructions stored in the memory, so that the method according to any one of the third aspect or the possible implementations of the third aspect is performed, or the method according to any one of the fourth aspect or the possible implementations of the fourth aspect is performed.

According to a twenty-fifth aspect, this application provides a wireless communication system. The system includes one or more of the devices according to the tenth aspect, the eleventh aspect, and the twelfth aspect.

DETAILED DESCRIPTION OF EMBODIMENTS

The following describes technical solutions in this application with reference to the accompanying drawings.

The technical solutions in embodiments of this application may be applied to various communication systems, for example, a long term evolution (LTE) system, a 5th generation (5G) system, or a communication system after 5G.

A terminal device in embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, a terminal device in another communication system, or the like. This is not limited in this application.

A radio access network device in embodiments of this application may be any device having a wireless transceiver function. The access network device includes but is not limited to an evolved NodeB (eNB), a radio network controller (RNC), a NodeB (NB), a base station controller (BSC), a base transceiver station (BTS), a home base station (home evolved NodeB, or home NodeB, HNB), a baseband unit (BBU), an access point (AP), a wireless relay node, a wireless backhaul node, a transmission point (TP) or a transmission reception point (TRP), or the like. Alternatively, the access network device may be a gNB or a transmission point in a 5G system, or a network node, for example, a baseband unit (BBU) or a distributed unit (DU), that constitutes a gNB or a transmission point.

In this application, for DC, there may be a plurality of combination manners. The following lists several combination manners.

(1) a Core Network is an Evolved Packet Core (EPC), an LTE Base Station is a Primary Base Station, and an NR Base Station is a Secondary Base Station.

Figure 1:
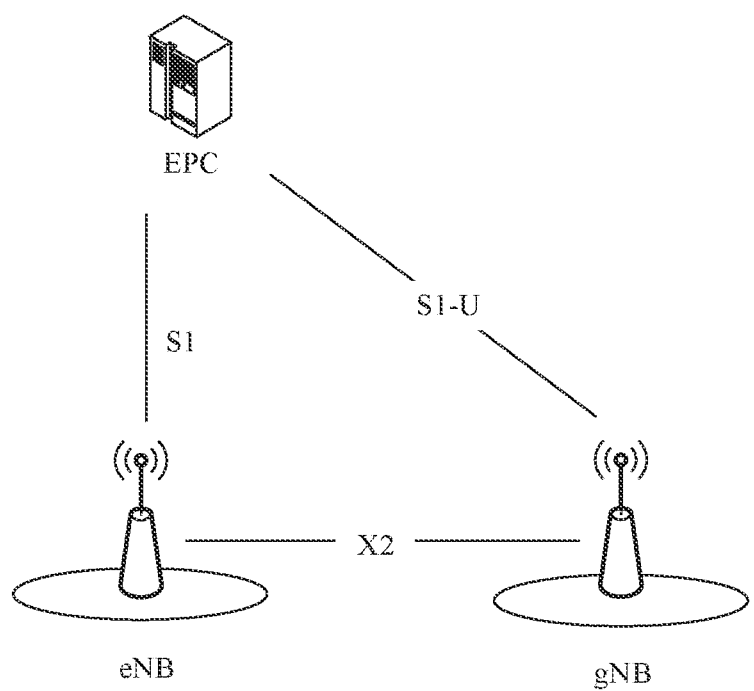
FIG. 1 shows an architecture of a communication system to which an embodiment of this application is applicable.

FIG. 1 shows an architecture of a communication system to which an embodiment of this application is applicable. As shown in FIG. 1, an X2 interface exists between the LTE base station and the NR base station. At least a control plane connection is included, and a user plane connection may be further included. An S1-U interface exists between the LTE base station and the EPC, that is, a user plane connection may be included. The LTE base station may provide an air interface resource for UE by using at least one LTE cell. In this networking case, the LTE base station may provide an air interface resource for the UE by using at least one LTE cell, and the at least one LTE cell is referred to as a master cell group (MCG). Correspondingly, the NR base station may also provide an air interface resource for the UE by using at least one NR cell, and the at least one NR cell is referred to as a secondary cell group (SCG).

(2) a Core Network is a 5GC, an LTE Base Station is a Primary Base Station, and an NR Base Station is a Secondary Base Station.

An Xn interface exists between the LTE base station and the NR base station. At least a control plane connection is included, and a user plane connection may be further included. An NG interface exists between the LTE base station and the 5GC. At least a control plane connection is included, and a user plane connection may be further included. An NG-U interface exists between the NR base station and the 5GC, that is, a user plane connection may be included. In this networking case, the LTE base station may provide an air interface resource for UE by using at least one LTE cell, and the at least one LTE cell is referred to as an MCG. Correspondingly, the NR base station may also provide an air interface resource for the UE by using at least one NR cell, and the at least one NR cell is referred to as an SCG.

(3) a Core Network is a 5GC, an NR Base Station is a Primary Base Station, and an LTE Base Station is a Secondary Base Station.

An Xn interface exists between the NR base station and the LTE base station. At least a control plane connection is included, and a user plane connection may be further included. An NG interface exists between the NR base station and the 5GC. At least a control plane connection is included, and a user plane connection may be further included. An NG-U interface exists between the NR base station and the 5GC, that is, a user plane connection may be included. In this networking case, the NR base station may provide an air interface resource for UE by using at least one NR cell, and the at least one NR cell is referred to as an MCG. Correspondingly, the LTE base station may also provide an air interface resource for the UE by using at least one LTE cell, and the at least one LTE cell is referred to as an SCG.

(4) a Core Network is a 5GC, and Both a Primary Base Station and a Secondary Base Station are NR Base Stations.

An interface between the primary base station and the secondary base station is an Xn interface. At least a control plane connection is included, and a user plane connection may be further included. An NG interface exists between the primary base station and the 5GC. At least a control plane connection is included, and a user plane connection may be further included. An NG-U interface exists between the secondary base station and the 5GC, that is, a user plane connection may be included. In this networking case, the primary base station may provide an air interface resource for UE by using at least one NR cell, and the at least one NR cell is referred to as an MCG. Correspondingly, the secondary base station may also provide an air interface resource for the UE by using at least one NR cell, and the at least one NR cell is referred to as an SCG.

Figure 2:
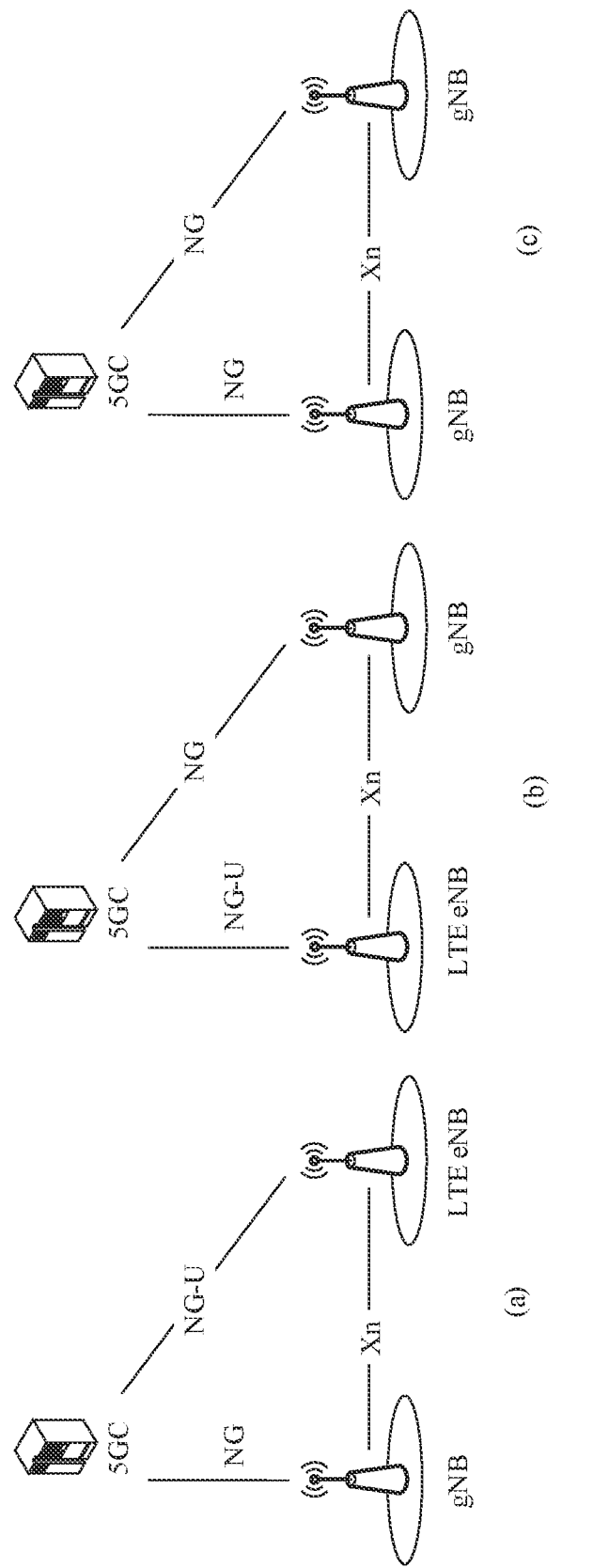
FIG. 2 shows architectures of other communication systems to which embodiments of this application are applicable.

When the core network is the 5GC, for the foregoing several networking architectures and interfaces between network elements, refer to FIG. 2. FIG. 2 shows architectures of other communication systems to which embodiments of this application are applicable. (a), (b), and (c) in FIG. 2 may respectively correspond to the networking architectures described in the examples (2), (3), and (4). Details are not described again.

Usually, in a DC manner, a primary base station is referred to as a master node (MN), and a secondary base station is referred to as a secondary node (SN).

In addition, an MR-DC architecture shown in FIG. 2 supports a plurality of types of bearers, for example, an MN terminated MCG bearer, an MN terminated SCG bearer, an MN terminated split bearer, an SN terminated MCG bearer, an SN terminated SCG bearer, and an SN terminated split bearer.

An MCG bearer represents a bearer used only for an MCG air interface resource. An SCG bearer represents a bearer used only for an SCG air interface resource. A split bearer represents a bearer used for both the MCG air interface resource and the SCG air interface resource. "MN terminated" or "SN terminated" indicates that a packet data convergence protocol (PDCP) entity is in the MN or the SN.

In addition, to facilitate understanding of the technical solutions of this application, concepts related to a network slice in embodiments of this application are briefly described.

In a mobile communication technology, requirements of emerging new services and new application scenarios for network functions, connection performance, security, and the like differ greatly. If a single network is used to carry these services, it is difficult to meet requirements for high bandwidth, low latency, high reliability, and the like at the same time. Therefore, in 5G, end-to-end network slicing (network slice) is used to provide users with customized network services. Specifically, through flexible allocation of network resources and on-demand networking, a plurality of isolated logical subnets with different features may be virtualized on a same set of physical infrastructures, to provide users with targeted services. Different logical subnets are identified and distinguished by using pieces of single network slice selection assistance information (S-NSSAI). Each piece of S-NSSAI may include the following content:

a slice type (slice/service type, SST), used to point to a specific feature and service type of a slice; and a slice differentiator (SD), used as a supplement to the SST, used to further distinguish between a plurality of network slice instances satisfying a same SST, and used as an optional parameter.

Pieces of S-NSSAI may be classified into a plurality of types. This specification describes only a type related to the following embodiments, that is, an allowed network slice (allowed NSSAI), indicating S-NSSAI that is in NSSAI requested by UE and that is allowed by a network.

Figure 3:
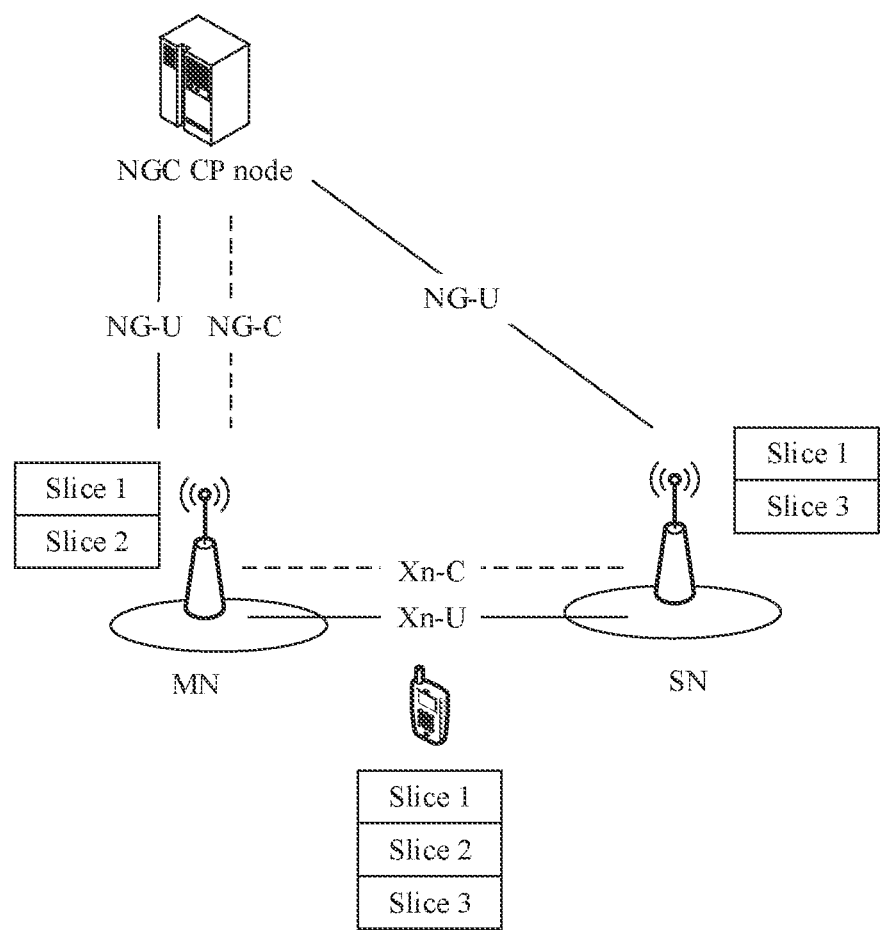
FIG. 3 is a schematic diagram of supporting network slices in a DC manner.

In some embodiments, a network slice supported by an access network device is at a granularity of a tracking area (TA). Therefore, if different cells of different access network devices or different cells of a same access network device belong to a same TA, network slices supported by these cells are the same. If these cells belong to different TAs, the network slices supported by these cells may be the same or may be different. With reference to FIG. 3, the following describes a schematic diagram in which an access network device supports a network slice in a DC manner.

FIG. 3 is a schematic diagram of supporting network slices in the DC manner. As shown in FIG. 3, it is assumed that in a DC scenario, an MN supports a slice 1 and a slice 2, and an SN supports the slice 1 and a slice 3. When UE initiates a service request for the slice 3 to a core network (CN) through the MN, the CN rejects the service request of the UE according to an existing protocol because the MN does not support the slice 3.

The following describes in detail the technical solutions provided in this application.

In a solution, when a network slice requested by UE is not supported by an MN, the MN provides a network slice service for the UE in a DC manner by adding a secondary base station supporting the network slice.

Figure 4:
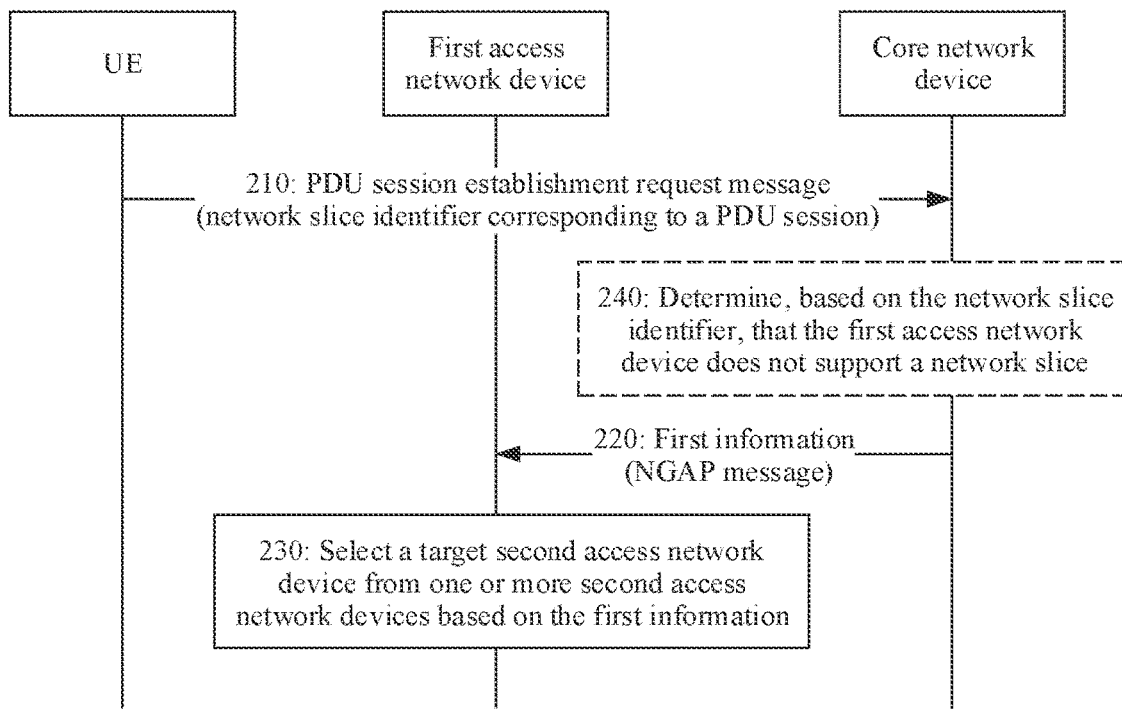
FIG. 4 is a schematic flowchart of a method for providing a network slice according to an embodiment of this application.

FIG. 4 is a schematic flowchart of a method for providing a network slice according to an embodiment of this application.

210: A terminal device sends a PDU session establishment request message to a core network device, where the PDU session establishment request message carries a network slice identifier.

The PDU session establishment request message is for requesting to establish a PDU session, and the network slice identifier is for identifying a network slice corresponding to the PDU session.

The core network device receives the PDU session establishment request message from the terminal device.

It may be understood that the PDU session establishment request message is a NAS message.

220: The core network device sends first information to a first access network device accessed by the terminal device, where the first information is for indicating one or more second access network devices that support the network slice.

The one or more second access network devices are one or more access network devices corresponding to a neighboring cell of the first access network device.

Optionally, the first information may include one or more of the following information about the neighboring cell of the first access network device:
  a physical cell identifier (PCI) list, where the PCI list includes one or more PCIs, and a cell corresponding to each PCI supports the network slice corresponding to the PDU session;
  a cell global identifier (CGI) list, where the CGI list includes one or more CGIs, and a cell corresponding to each CGI supports the network slice corresponding to the PDU session;
  a PCI list and an identifier of a second access network device associated with each PCI in the PCI list, where the second access network device associated with each PCI supports the network slice corresponding to the PDU session;
  identifiers of the one or more second access network devices, where each second access network device supports the network slice corresponding to the PDU session;
  a radio access network area code (RAN AC) list, where a cell corresponding to each RAN AC in the RAN AC list supports the network slice corresponding to the PDU session;
  a closed access group identifier (CAG ID) list, where a cell corresponding to each CAG ID in the CAG ID list supports the network slice corresponding to the PDU session;
  a radio access network slice area identifier (RSA ID) list, where a cell corresponding to each RSA ID in the RSA ID list supports the network slice corresponding to the PDU session;
  carrier information, where the carrier information includes one or more carriers, and each carrier supports the network slice corresponding to the PDU session; or
  carrier information and cell information, where the carrier information includes one or more carriers, and each carrier supports the network slice corresponding to the PDU session.

It should be noted that a correspondence may be established between a carrier and a network slice. Therefore, for each given carrier, a network slice corresponding to the carrier may be found.

In addition, in an embodiment, for any list or information included in the first information, a sequence of identifiers or information included in the list or the information indicates a priority sequence.

Optionally, a sequence of PCIs included in the PCI list indicates a priority sequence of cells corresponding to the PCIs in the PCI list;
  a sequence of CGIs included in the CGI list indicates a priority sequence of cells corresponding to the CGIs in the CGI list;
  a sequence of identifiers of second access network devices indicates a priority sequence of the second access network devices;
  a sequence of RAN ACs included in the RAN AC list indicates a priority sequence of cells corresponding to the RAN ACs in the RAN AC list;
  a sequence of CAG IDs included in the CAG ID list indicates a priority sequence of cells corresponding to the CAG IDs in the CAG ID list;
  a sequence of RSA IDs included in the RSA ID list indicates a priority sequence of cells corresponding to the RSA IDs in the RSA ID list; or
  a sequence of carriers included in the carrier information indicates a priority sequence of the carriers.

The carrier information is used as an example. It is assumed that a sequence of carriers included in the carrier information is a carrier 1, a carrier 2, and a carrier 3, where the carrier 1, the carrier 2, and the carrier 3 all support the network slice corresponding to the PDU session. The sequence of the carrier 1, the carrier 2, and the carrier 3 in the carrier information indicates a priority sequence of the carriers. It is assumed that a front-to-back order indicates a descending order of priorities. In this case, according to the descending order of the priorities, the carriers are sequentially arranged as follows: the carrier 1, the carrier 2, and the carrier 3.

Then, the RSA ID list is used as an example. It is assumed that a sequence of RSA IDs included in the RSA ID list is an RSA ID 1, an RSA ID 2, and an RSA ID 3, where the RSA ID 1, the RSA ID 2, and the RSA ID 3 all support the network slice corresponding to the PDU session. It is assumed that a front-to-back order of the RSA IDs indicates a descending order of priorities. In this case, according to the descending order of the priorities, the RSA IDs are sequentially arranged as follows: the RSA ID 1, the RSA ID 2, and the RSA ID 3.

Then, the PCI list is used as an example. It is assumed that a sequence of PCIs included in the PCI list is a PCI 1, a PCI 2 . . . , and a PCI m, where the PCI 1, the PCI 2, . . . , and the PCI m all support the network slice corresponding to the PDU session. Similarly, it is assumed that a front-to-back order of the PCIs in the PCI list indicates a descending order of priorities. In this case, according to the descending order of the priorities of the PCIs included in the PCI list, the PCIs are sequentially arranged as follows: the PCI 1, the PCI 2, . . . , and the PCI in, where m is a positive integer.

PCIs, CGIs, neighboring cells, base stations, or the like that are provided by the core network device for the first access network device and that support the network slice may be arranged according to a priority sequence, so that the first access network device may select an SN based on the priority sequence. In this way, the selected SN may provide a better network slice service for the UE, so that network slice performance is improved.

Optionally, the priority sequence in the foregoing list may alternatively be an ascending order. This is not limited.

In embodiments of this application, an RSA indicates a RAN slice area, or may be understood as a RAN-side resource or a RAN-side network slice resource. As described above, in some embodiments, a network slice supported by an access network device is at a granularity of a TA. Therefore, cells belonging to a same TA support a same network slice, and cells belonging to different TAs may support a same network slice or may support different network slices.

Further, in some embodiments, one TA may continue to be divided into a plurality of RAN slice areas, a plurality of RAN-side resources, or a plurality of RAN-side network slice resources, namely, RSAs. Cells belonging to a same RSA support a same network slice, and cells belonging to different RSAs may support a same network slice or may support different network slices. In other words, cells with a same RSA ID in a TA range support a same network slice, that is, cells broadcasting a same RSA ID in the TA range support a same network slice. The following provides descriptions with reference to FIG. 5 by using examples.

Figure 5:
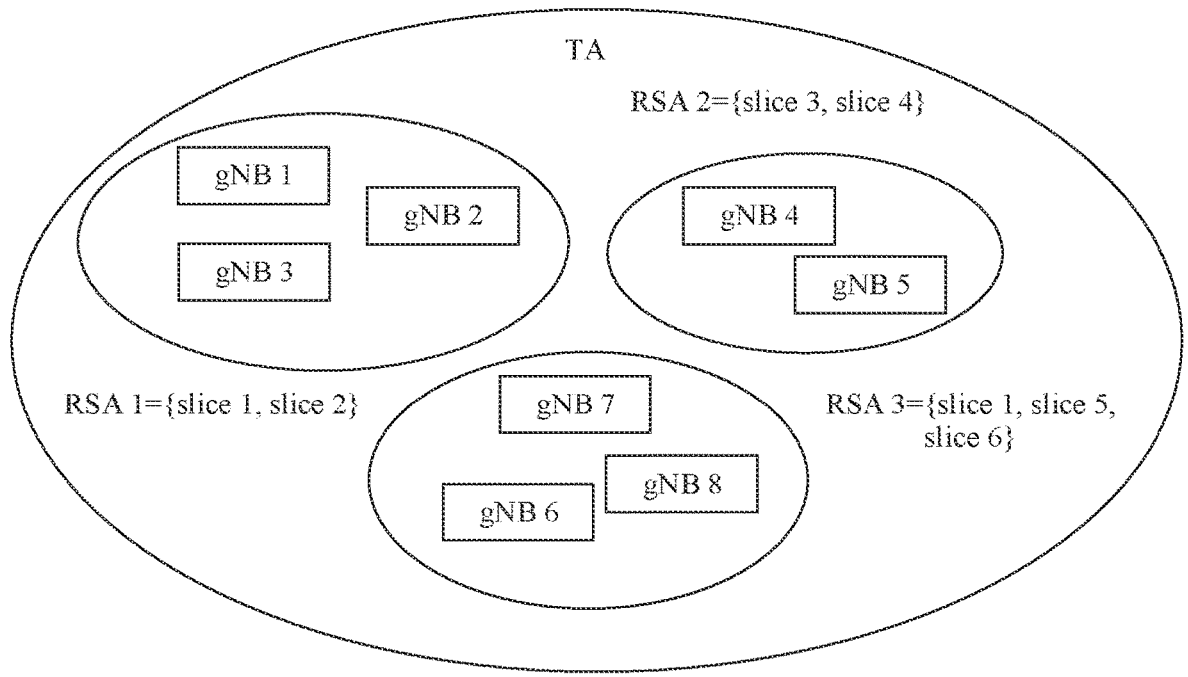
FIG. 5 is a schematic diagram of RAN slice area identifiers.

FIG. 5 is a schematic diagram of RAN slice area identifiers. As shown in FIG. 5, in a TA, network slices supported by a gNB 1 to a gNB 8 include a slice 1 to a slice 6. The TA may be divided into three RSAs, where IDs of the three RSAs may be denoted as an RSA 1, an RSA 2, and an RSA 3 respectively. Base stations with a same RSA ID support a same network slice. For example, the gNB 1, the gNB 2, and the gNB 3 belong to the RSA 1, and each support the network slice 1 and the network slice 2. The gNB 6, the gNB 7, and the gNB 8 belong to the RSA 3, and each support the network slice 1, the network slice 5, and the network slice 6. It is assumed that a base station broadcasts an RSA ID. A mapping relationship between the RSA ID and at least one network slice may be actively sent by the base station to a terminal device, or may be sent by the base station to the UE after the terminal device requests the mapping relationship. For example, the base station notifies the terminal device of an identifier (for example, S-NSSAI) of the at least one network slice by using an RRC reconfiguration message, or notifies the terminal device of the RSA ID and an identifier of the at least one network slice by using an RRC reconfiguration message. The terminal device may learn, with reference to a broadcast message and the RRC message of the base station, of the identifier of the network slice supported by the base station in which the terminal device is currently located. When the UE moves within an area corresponding to the RSA ID, the UE does not need to obtain the mapping relationship again. When a moving range of the UE changes, for example, the UE moves out of a TA range, the UE needs to obtain a mapping relationship again.

In another possible case, a TA is divided into a plurality of areas, and a base station in each area broadcasts at least one RSA ID. Base stations in a same area broadcast a same RSA ID. For example, the TA is divided into an area 1, an area 2, and an area 3. In the area 1, all base stations broadcast an RSA ID #1 and an RSA ID #2. The RSA ID #1 corresponds to network slices #1 and #2, and the RSA ID #2 corresponds to a network slice #3. In the area 2, all base stations broadcast an RSA ID #3, an RSA ID #4, and an RSA ID #5. The RSA ID #3 corresponds to network slices #4, #5, and #6. The RSA ID #4 corresponds to network slices #7 and #8. The RSA ID #5 corresponds to network slices #9 and #10. In the area 3, all base stations broadcast an RSA ID #6. The RSA ID #6 corresponds to network slices #11 and #12. The RSA ID may be understood as a RAN-side resource or a RAN-side network slice resource in the area. One RAN-side resource/RAN-side network slice resource supports at least one network slice. Different RAN-side resources/RAN-side network slice resources support different network slices.

After a concept of sharing between public land mobile networks (PLMNs) is introduced, a base station may broadcast a plurality of PLMN identifiers, where one PLMN is a primary PLMN and another PLMN is an equivalent PLMN. When the base station broadcasts an RSA ID, in a possible case, the base station broadcasts one or more RSA IDs corresponding to each PLMN ID. For example, the base station broadcasts an RSA ID #1 corresponding to a PLMN ID #1 and an RSA ID #2 corresponding to a PLMN ID #2.

In another possible case, the base station broadcasts one or more RSA IDs, where the RSA ID is not associated with the PLMN ID, that is, the RSA ID does not change with the PLMN ID. For example, when an RSA is understood as a RAN-side resource or a RAN-side network slice resource, the resource does not change with a PLMN ID, and the RAN-side resource is shared by a plurality of PLMNs. However, different PLMNs may lease a same RAN-side resource to different tenants, and the tenant herein may be identified by using a network slice identifier S-NSSAI. In this case, when sending a mapping relationship between an RSA ID and at least one piece of S-NSSAI to UE, the base station needs to consider a PLMN in which the UE is currently located.

For a case in which a terminal device initiates a registration procedure to a core network through a current base station:

Step 1: The terminal device includes a PLMN identifier in an RRC connection setup complete message.

When sending a registration request to a core network device, the terminal device notifies the base station of a PLMN selected for registration. For example, the terminal device includes a selected PLMN-Identity in an RRCSetupComplete message.

Step 2: The base station receives the RRC connection setup complete message, and determines at least one piece of corresponding S-NSSAI based on the PLMN identifier carried in the message. The base station sends the at least one piece of S-NSSAI to the terminal device.

Based on the previous assumption, a mapping relationship between an RSA ID and S-NSSAI may vary in different PLMNs. The base station finds the at least one piece of corresponding S-NSSAI based on the PLMN ID sent by the terminal device, and sends the at least one piece of S-NSSAI to the terminal device by using an RRC reconfiguration message, or sends an RSA ID and the at least one piece of corresponding S-NSSAI to the terminal device by using an RRC reconfiguration message. For example, when the base station broadcasts only one RSA ID, the RRC reconfiguration message sent by the base station to the terminal device may include only at least one piece of S-NSSAI. For example, when the base station broadcasts a plurality of RSA IDs (for example, an RSA ID #1 and an RSA ID #2), the RRC reconfiguration message sent by the base station to the terminal device includes the RSA IDs and at least one piece of S-NSSAI corresponding to each RSA ID, for example, includes the RSA ID #1 and at least one piece of S-NSSAI corresponding to the RSA ID #1, and the RSA ID #2 and at least one piece of S-NSSAI corresponding to the RSA ID #2.

For a case in which a terminal device initiates a request to a current base station to obtain an RSA ID and at least one piece of S-NSSAI:

Step 1: The terminal device requests, from the base station, a mapping relationship that corresponds to a PLMN ID and that is between an RSA ID and at least one piece of S-NSSAI.

In a possible case, the terminal device includes the PLMN ID in an uplink RRC message or another message. For example, the uplink RRC message is a newly defined RRC message, and the RRC message indicates that the terminal device requests, from the base station, the mapping relationship between an RSA ID and at least one piece of S-NSSAI. In another possible case, an existing uplink RRC message in a standard is reused, where the uplink RRC message includes the PLMN ID and a first indication. The first indication is for indicating to request, from the base station, the mapping relationship between an RSA ID and at least one piece of S-NSSAI. Optionally, the uplink RRC message may further include an RSA ID.

Step 2: The base station sends, to the terminal device, at least one piece of S-NSSAI corresponding to the PLMN ID, or the mapping relationship between an RSA ID and at least one piece of S-NSSAI.

The base station finds, based on the PLMN ID, the corresponding mapping relationship between an RSA ID and at least one piece of S-NSSAI. For example, the base station supports a PLMN ID #1 to a PLMN ID #5, and the terminal device requests to obtain a mapping relationship that corresponds to the PLMN ID #3 and that is between an RSA ID and at least one piece of S-NSSAI. The base station sends, to the terminal device, at least one piece of S-NSSAI corresponding to the PLMN ID #3, or the mapping relationship between an RSA ID and at least one piece of S-NSSAI.

In some embodiments, after the UE completes initial registration, the core network device sends allowed S-NSSAI to the UE based on slice subscription information of the UE by using a non-access stratum (NAS) message. Then, a slice corresponding to a protocol data unit (PDU) session request initiated by the UE usually needs to belong to the allowed S-NSSAI.

In addition, cells broadcasting a same RAN AC support a same network slice. Cells broadcasting a same CAG ID support a same network slice. Cells with a same RSA ID support a same network slice.

The first access network device receives the first information from the core network device.

230: The first access network device selects a target second access network device from the one or more second access network devices based on the first information.

The first access network device selects the target second access network device as the SN based on the first information provided by the core network device. Subsequently, the terminal device accesses the target second access network device to obtain a service of the network slice.

Optionally, before step 220, step 240 may be further included.

240: The core network device determines, based on a network slice supported by the first access network device, that the first access network device does not support the network slice corresponding to the PDU session.

In other words, after receiving the PDU session establishment request message from the terminal device, the core network device determines, based on the network slice identifier carried in the PDU session establishment request message and the network slice supported by the first access network device, whether the first access network device supports the network slice corresponding to the PDU session. When determining that the first access network device does not support the network slice, the core network device provides the first access network device with information about a cell that is in a neighboring cell of the first access network device and that supports the network slice, that is, the first information, to assist the first access network device in selecting, from the neighboring cell, a neighboring cell that supports the network slice. Therefore, the network slice service is provided for the UE in a dual connectivity (DC) manner or a handover (HO) manner, and a service requirement of the terminal device is met.

The core network device may obtain, in a plurality of manners, information about the network slice supported by the first access network device.

For example, in an implementation, an AMF obtains, based on operation, administration and maintenance (OAM) preconfiguration information, the information about the network slice supported by the first access network device.

For another example, in another implementation, the core network device interacts with the first access network device through an interface between the core network device and the first access network device, to obtain the information about the network slice supported by the first access network device.

As described above, in different networking architectures, interfaces between the MN and the core network device are also different. For details, refer to the foregoing descriptions in FIG. 1 and FIG. 2.

Figure 6:
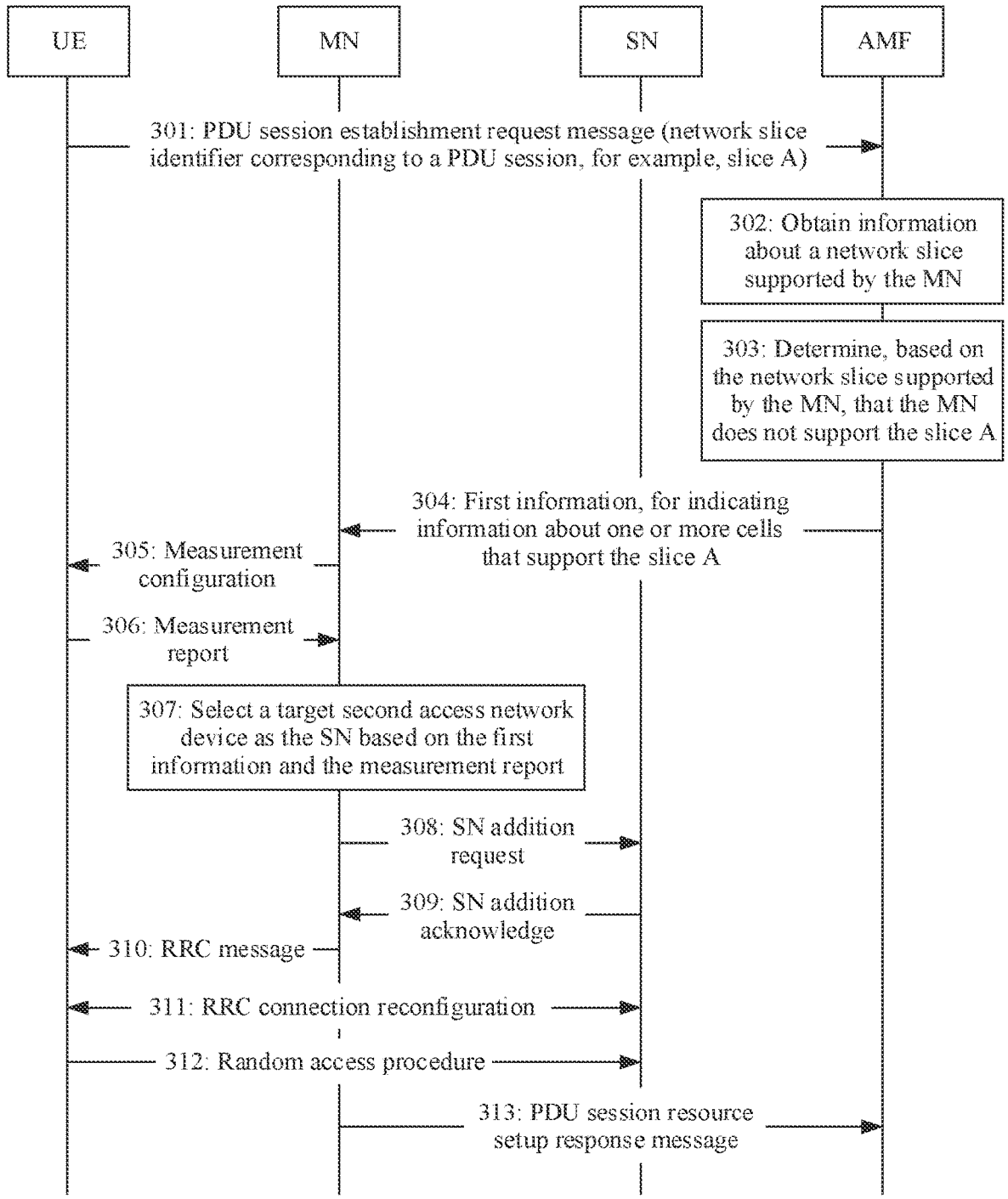
FIG. 6 is a schematic flowchart of providing a network slice by an MN for a terminal device in a DC manner.

With reference to FIG. 6, the following describes a procedure in which an MN provides a network slice for a terminal device in a DC manner.

FIG. 6 is a schematic flowchart of providing a network slice by an MN for a terminal device in the DC manner.

301: The UE sends a PDU session establishment request message to an AMF. The PDU session establishment request message is for requesting to establish a PDU session, and the PDU session establishment request message carriers a network slice identifier corresponding to the PDU session, for example, S-NSSAI.

Herein, the AMF is used as an example of a core network device. In different communication systems, a network element that has a function of the core network device in embodiments of this application may have another name. This is not limited.

For ease of description, it is assumed that a network slice corresponding to the PDU session is a network slice A.

The AMF receives the PDU session establishment request message from the UE, and obtains identification information of the network slice A.

302: The AMF obtains information about a network slice supported by the MN.

For step 302, refer to the foregoing plurality of implementations in which the core network device obtains the information about the network slice supported by the first access network device. Details are not described herein again.

303: The AMF determines, based on the network slice supported by the MN, whether the MN supports the network slice A.

In a possible case, the network slice supported by the MN includes the network slice A, that is, the MN supports the network slice A. In this case, the MN may provide a service of the network slice A for the UE. This case is not concerned in this specification.

In another possible case, the network slice supported by the MN does not include the network slice A, that is, the MN does not support the network slice A.

When the AMF determines that the MN does not support the network slice A, the AMF provides the MN with information about a neighboring cell that supports the network slice A, as shown in step 304.

304: The AMF sends first information to the MN, where the first information is for indicating information about one or more cells that support the network slice A.

In addition, the first information may further include carrier information, as described above. Details are not described herein again.

It should be understood that the one or more cells that support the network slice A are neighboring cells of the MN.

Optionally, the first information may include information about the cell that supports the network slice A, for example, a PCI list, a CGI list, a RAN AC list, and a CAG ID list. Alternatively, the first information may include information about a second access network device corresponding to the cell that supports the network slice A, for example, an identifier of the second access network device. Alternatively, the first information may include information about the cell and information about an access network device, for example, a PCI list and identification information of a second access network device associated with each PCI in the PCI list.

The MN receives the first information from the AMF.

Herein, the first information may be carried in a next generation application protocol (NGAP) message sent by the AMF to the MN, for example, a PDU session resource setup request message or another NGAP message. This is not limited herein.

After the MN receives the first information from the AMF, in some embodiments, the MN may configure the UE to perform radio resource management (RRM) measurement on each neighboring cell, to obtain a measurement report of each neighboring cell, as shown in steps 305 and 306, to assist the MN in selecting a target second access network device as an SN from a second access network device corresponding to the neighboring cell that supports the network slice A.

305: The MN sends a measurement configuration to the UE.

306: The UE performs RRM measurement on each neighboring cell of the first access network device based on the measurement configuration, and sends the measurement report to the MN.

In some other embodiments, after receiving the first information from the AMF, the MN may alternatively select the target second access network device based on a historical measurement report of each neighboring cell. In this case, steps 305 and 306 may be omitted, and a used manner is not limited in this application.

307: The MN selects, based on the first information and the measurement report of each neighboring cell, an appropriate second access network device as the SN from one or more second access network devices indicated by the first information.

It should be understood that the SN is the target second access network device in embodiments of this application.

308: The MN sends an SN addition request message to the SN.

In an example, the SN addition request message may be an SN addition request.

309: The SN returns an SN addition request acknowledge message to the MN.

In an example, the SN addition acknowledge message may be secondary node addition acknowledge (SN addition ACK).

310: The MN sends an RRC connection reconfiguration message to the UE, where the RRC connection reconfiguration message is used by the UE to access the SN.

Specifically, the RRC connection reconfiguration message carries information about an RRC configuration of the SN.

The RRC connection reconfiguration message may be represented as RRC connection reconfiguration.

311: The UE completes RRC connection reconfiguration based on the RRC connection reconfiguration message, and sends an RRC connection reconfiguration complete message to the MN.

The RRC connection reconfiguration complete message may be represented as RRC connection reconfiguration complete.

312: The UE performs a random access procedure, to access the SN.

313: The MN sends a PDU session resource setup request response message to the AMF.

The PDU session resource setup request response message may carry user plane tunnel address information of the SN.

After accessing the SN, the UE may continue the PDU session by using a network slice service provided by the SN.

In the embodiments shown in FIG. 5 and FIG. 6, the core network device (for example, the AMF) indicates, to the MN, the information about the cell that supports the network slice requested by the UE, and the MN may transfer, in the DC or HO manner, a service of the UE to the neighboring cell that supports the network slice. This can prevent a CN or a RAN from directly rejecting a service request for the network slice, and the service requirement of the terminal device is met.

In another implementation, the MN may alternatively hand over, in the HO manner, the UE to the cell that supports the network slice. A difference from the foregoing embodiments lies in that after the MN finds the SN, the UE is handed over from the MN to the SN, and the SN provides a network slice service for the UE.

In another solution, this application provides that when sending a PDU session establishment request message from a NAS to an AS, a terminal device also sends information about a network slice corresponding to a PDU session to the AS. Therefore, after obtaining a message of the AS, an MN may determine in advance whether the network slice is supported, and determine whether there is an appropriate SN for providing a corresponding network slice service for the UE.

Figure 7:
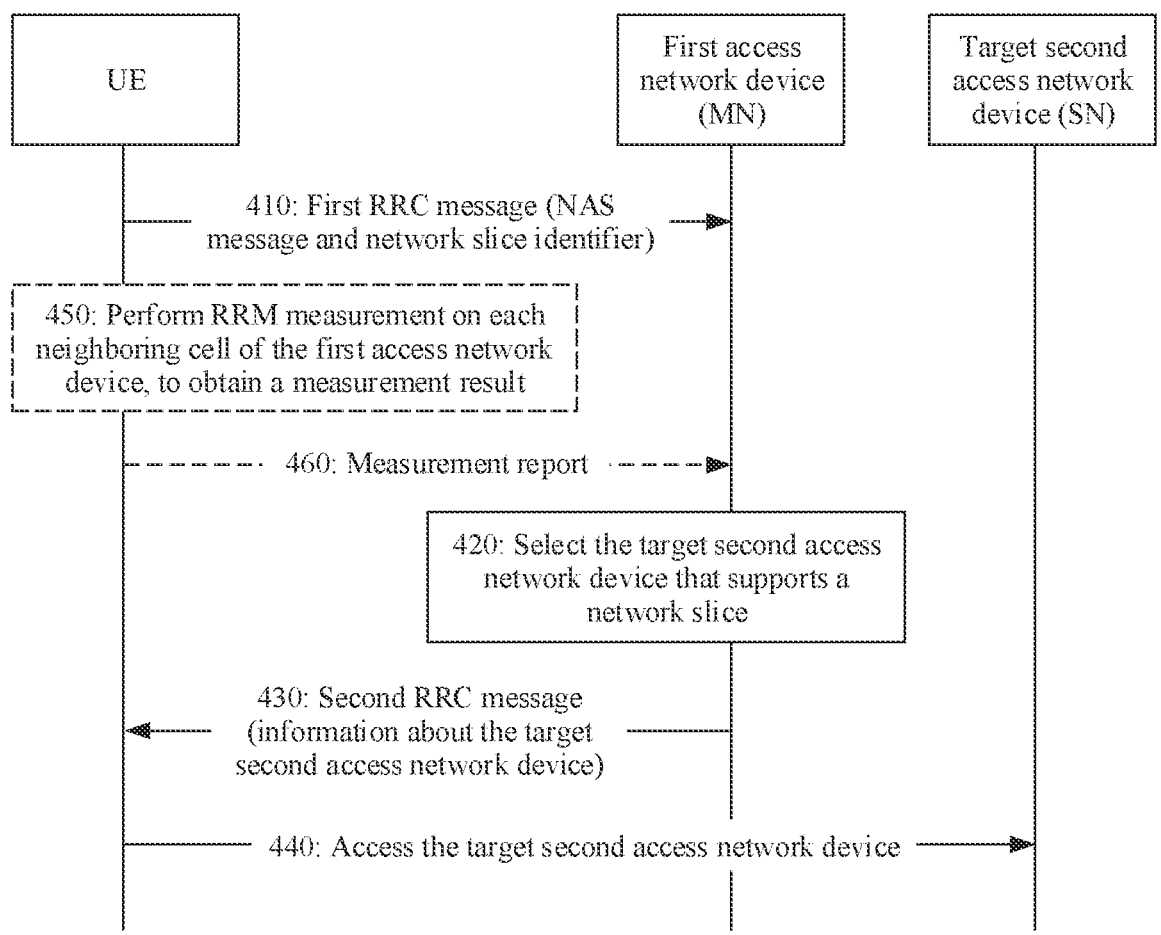
FIG. 7 is another schematic flowchart of providing a network slice according to this application.

FIG. 7 is another schematic flowchart of providing a network slice according to this application.

410: A terminal device sends a first RRC message to a first access network device, where the first RRC message includes a NAS message and a network slice identifier.

The NAS message is for requesting to establish a PDU session, and the network slice identifier is for identifying a network slice corresponding to the PDU session.

Optionally, in an implementation, when determining that the first access network device does not support the network slice corresponding to the PDU session, the terminal device includes the network slice identifier in the first RRC message.

The terminal device may determine, in the following plurality of manners, that the first access network device does not support the network slice.

For example, an AS of the terminal device obtains, from the first access network device, information about a network slice supported by the first access network device, and sends, to a NAS of the terminal device, the information about the network slice supported by the first access network device. When the NAS initiates the PDU session, the NAS determines that the network slice corresponding to the PDU session belongs to an allowed network slice, and determines, based on the information about the network slice supported by the first access network device, that the network slice corresponding to the PDU session is not supported by the first access network device. In this case, the first RRC message sent by the AS of the terminal device to the first access network device carries the NAS message and the network slice identifier.

For another example, when a NAS of the terminal device initiates the PDU session, if the NAS determines that the network slice corresponding to the PDU session belongs to an allowed network slice, the NAS sends the NAS message and the network slice identifier corresponding to the PDU session to an AS. The AS of the terminal device obtains, from the first access network device, information about a network slice supported by the first access network device. When determining that the network slice corresponding to the PDU session is not supported by the first access network device, the AS of the terminal device includes the network slice identifier in the first RRC message sent to the first access network device.

For another example, an AS of the terminal device obtains, from the first access network device, information about a network slice supported by the first access network device. In addition, the AS of the terminal device receives, from a NAS, the network slice identifier and information about an allowed network slice. The AS of the terminal device determines, based on the network slice supported by the first access network device and the allowed network slice, that the network slice corresponding to the PDU session belongs to the allowed network slice and that the network slice is not supported by the first access network device. In this case, the AS of the terminal device sends the first RRC message to the first access network device, where the first RRC message carries the network slice identifier.

Alternatively, in embodiments of this application, the NAS may also be referred to as a higher layer, and the AS may also be referred to as an RRC layer.

In the foregoing examples, the NAS and the AS of the terminal device may share, through interaction, the allowed network slice and the network slice supported by the first access network device. Therefore, when the terminal device initiates the PDU session, the NAS or the AS of the terminal device may determine whether the network slice corresponding to the initiated PDU session is supported by the first access network device.

Usually, the network slice corresponding to the PDU session initiated by the NAS is an allowed network slice.

When the network slice corresponding to the PDU session initiated by the terminal device is not supported by the first access network device, the AS of the terminal device includes an identifier of the network slice corresponding to the PDU session in the RRC message sent to the first access network device.

In another implementation, a NAS or an AS of the terminal device may not perform determining, to be specific, not determine whether the network slice corresponding to the PDU session initiated by the NAS is supported by the first access network device. Instead, when the NAS initiates the PDU session, the NAS sends the network slice identifier corresponding to the PDU session to the AS by default, and then the AS sends the network slice identifier to the first access network device by using the RRC message.

In the foregoing embodiments, when initiating the PDU session, the NAS of the terminal device determines whether the network slice corresponding to the PDU session is supported by the first access network device. If the first access network device does not support the network slice, the NAS of the terminal device sends the network slice identifier to the AS, so that the AS includes the network slice identifier in the RRC message and sends the RRC message to the first access network device. Alternatively, when the NAS of the terminal device initiates the PDU session, neither the NAS nor the AS of the terminal device determines whether the first access network device supports the network slice corresponding to the PDU session. Instead, the network slice identifier is included in the RRC message by default, and the AS sends the RRC message to the first access network device.

In another embodiment, in a procedure in which the terminal device initially registers with a core network, after the terminal device completes registration, a core network device may indicate the NAS of the terminal device to send, to the AS when the NAS initiates a PDU session, an identifier of a network slice corresponding to the PDU session. Once the terminal device initiates a PDU session, the NAS sends, to the AS by default, a network slice identifier corresponding to the initiated PDU session.

The foregoing behavior of the terminal device may be specified in a protocol, may be preconfigured, and so on.

The first access network device receives the first RRC message from the terminal device.

The first access network device may learn, based on the NAS message and the network slice identifier that are carried in the first RRC message, of the network slice requested by the terminal device. Further, the first access network device may perform step 420.

420: The first access network device selects, from a neighboring cell, a target second access network device that supports the network slice.

Specifically, the first access network device obtains a network slice supported by an access network device corresponding to each neighboring cell, and searches, in the neighboring cell based on the network slice identifier carried in the first RRC message, for an access network device that supports the network slice corresponding to the PDU session, where the access network device is used as an SN.

Optionally, when searching for the SN that supports the network slice, in addition to information about a network slice supported by each neighboring cell, the first access network device may select the appropriate SN with reference to a measurement report of the UE on each neighboring cell.

The measurement report of each neighboring cell may be a historical measurement report, or may be obtained by the first access network device by configuring, after receiving the first RRC message, the UE to perform RRM measurement again. This is not limited.

430: The terminal device receives a second RRC message from the first access network device, where the second RRC message carries information about the target second access network device.

The target second access network device supports the network slice, and a cell corresponding to the target second access network device is a neighboring cell of the first access network device.

440: The terminal device accesses the target second access network device based on the second RRC message.

In other words, the first access network device is an MN, and the target second access network device is the SN.

After the terminal device accesses the target second access network device, the target second access network device provides the terminal device with a service of the network slice corresponding to the PDU session.

In steps 420 to 440, when the first access network device does not support the network slice corresponding to the PDU session initiated by the terminal device, the network slice service is provided for the terminal device by finding the neighboring cell that supports the network slice corresponding to the PDU session, so that network slice performance is improved.

Optionally, in some embodiments, in step 410, when the terminal device initiates the PDU session, if the terminal device determines that the network slice corresponding to the PDU session is not supported by the first access network device, the terminal device may further trigger RRM measurement and provide a measurement result of the RRM measurement for the first access network device, or the terminal device may trigger reporting of a historical measurement report, to assist the first access network device in determining and searching for, in the neighboring cell, the SN that supports the network slice, as shown in steps 450 and 460.

450: When the terminal device determines that the network slice corresponding to the PDU session is not supported by the first access network device, the terminal device performs RRM measurement on each neighboring cell of the first access network device, to obtain the measurement result.

460: The terminal device sends the measurement result to the first access network device.

When the method 400 includes steps 450 and 460, in step 420, the first access network device may select an appropriate target second access network device as the SN based on the measurement result that is from the terminal device and the information about the network slice supported by each neighboring cell, and provide the network slice service for the terminal device by adding the SN as a secondary base station.

Figure 8:
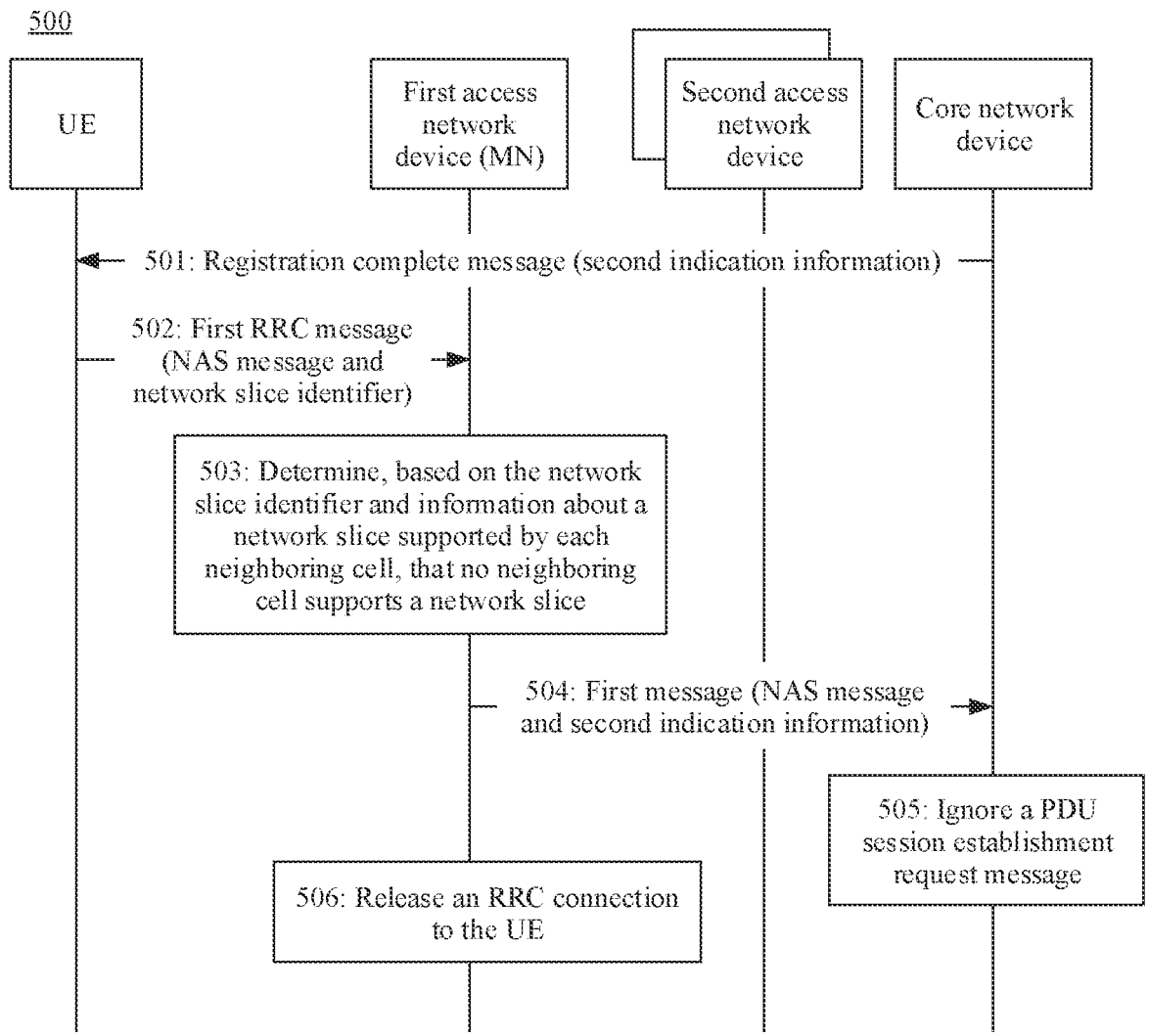
FIG. 8 is a schematic diagram of another embodiment of providing a network slice according to this application.

In a possible case, no neighboring cell of the first access network device supports the network slice corresponding to the PDU session, as shown in a procedure shown in FIG. 8.

FIG. 8 is a schematic diagram of another embodiment of providing a network slice according to this application.

501: After a terminal device completes registration with a core network, a core network device sends a registration complete message to the UE, where the registration complete message carries first indication information, the first indication information is for indicating that when the terminal device initiates a PDU session, a NAS of the terminal device needs to send, to an AS of the terminal device, an identifier of a network slice corresponding to the PDU session.

A procedure in which the terminal device registers with the core network is not described in detail in this specification. A person skilled in the art may understand that step 501 can be implemented in a registration process of the terminal device with the core network.

In addition, in step 501, in the registration process of the UE, the core network device indicates, to the UE, that the NAS needs to provide a network slice identifier for the AS when a PDU session is initiated. This is also applicable to another embodiment.

502: The terminal device sends a first RRC message to a first access network device, where the first RRC message includes a NAS message and a network slice identifier.

The NAS message is for requesting to establish a PDU session, and the network slice identifier is for identifying a network slice corresponding to the PDU session.

For descriptions of step 502, refer to step 410. Details are not described again.

The first access network device receives the first RRC message from the terminal device.

503: The first access network device determines, based on the network slice identifier and information about a network slice supported by each neighboring cell, that no neighboring cell supports the network slice.

In other words, the first access network device determines, based on the network slice identifier carried in the first RRC message and the network slice supported by each neighboring cell, that there is no neighboring cell supporting the network slice corresponding to the PDU session.

504: The first access network device sends a first message to the core network device, where the first message carries second indication information.

The second indication information is for indicating that the first access network device does not support the network slice corresponding to the PDU session initiated by the terminal device.

It should be understood that, in this case, the second indication information indicates that the first access network device does not support the network slice corresponding to the PDU session, and further indicates that no neighboring cell of the first access network device supports the network slice.

505: The core network device ignores a PDU session establishment request message of the terminal device based on the second indication information.

Specifically, if the first message carries the second indication information, it indicates that the first access network device does not support the network slice and no neighboring cell of the first access network device supports the network slice. If the first message carries the second indication information and information about a target second access network device, it indicates that the first access network device does not support the network slice but the target second access network device supports the network slice.

Therefore, if the first message carries the second indication information, the core network device ignores the PDU session establishment request message of the terminal device.

506: The first access network device releases an RRC connection to the terminal device, and rejects to establish the PDU session initiated by the terminal device.

It should be understood that there is no sequence between step 505 and step 506.

In another possible case, the first access network device determines, based on a network slice supported by the first access network device and the network slice identifier carried in the first message, that the first access network device does not support the network slice corresponding to the PDU session. However, the first access network device finds, from a second access network device corresponding to a neighboring cell based on the information about the network slice supported by each neighboring cell, the target second access network device that supports the network slice. The following describes this case with reference to FIG. 9.

Figure 9:
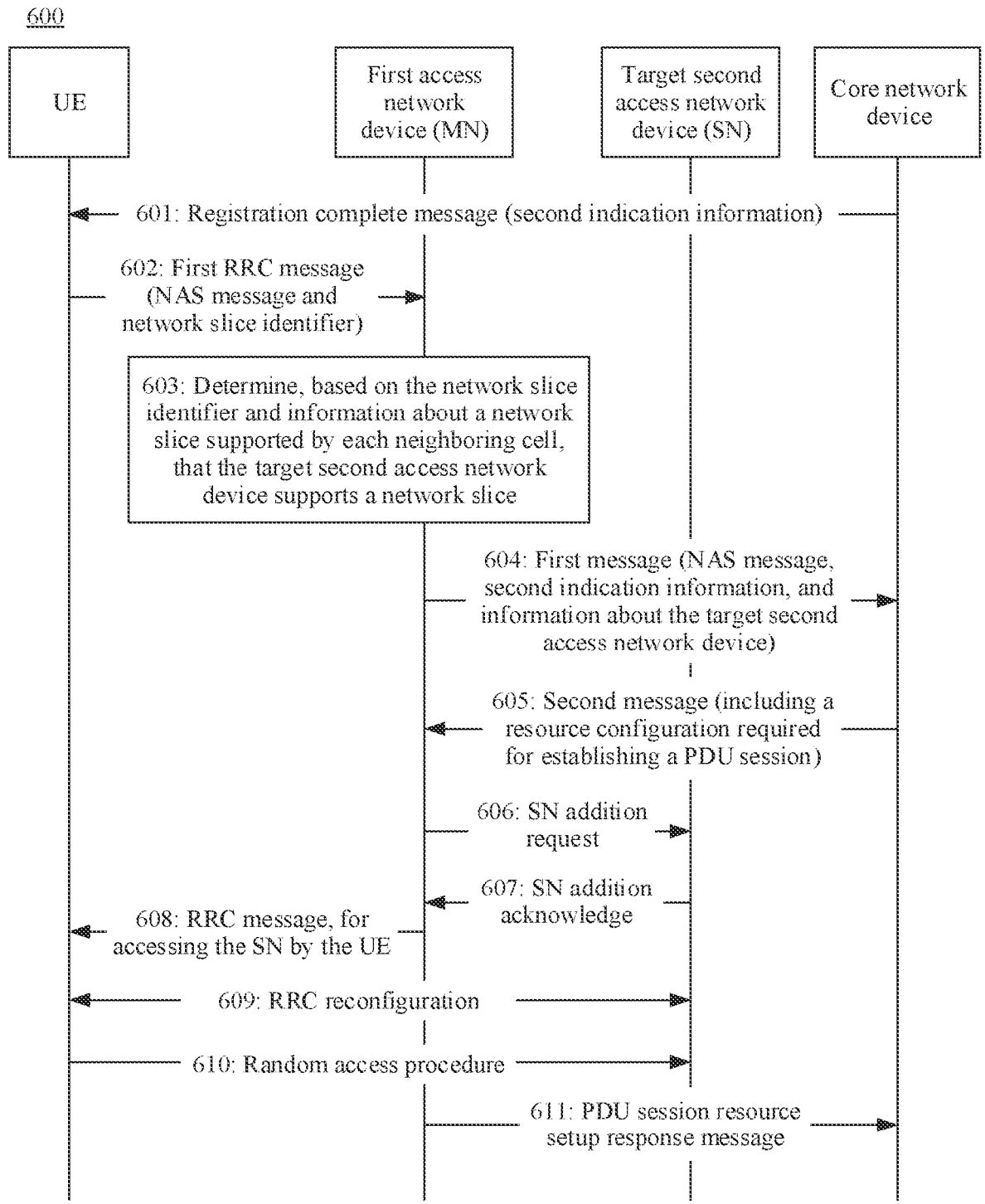
FIG. 9 is a schematic diagram of another embodiment of providing a network slice according to this application.

FIG. 9 is a schematic diagram of another embodiment of providing a network slice according to this application.

601: After a terminal device completes registration with a core network, a core network device sends a registration complete message to the UE, where the registration complete message carries first indication information, the first indication information is for indicating that when the terminal device initiates a PDU session, a NAS of the terminal device needs to send, to an AS of the terminal device, an identifier of a network slice corresponding to the PDU session.

602: The terminal device sends a first RRC message to a first access network device, where the first RRC message includes a NAS message and a network slice identifier.

The NAS message is for requesting to establish a PDU session, and the network slice identifier is for identifying a network slice corresponding to the PDU session.

603: The first access network device determines, based on the network slice identifier and information about a network slice supported by each neighboring cell, that a target second access network device supports the network slice.

A cell corresponding to the target second access network device is a neighboring cell of the first access network device. The target second access network device supports the network slice corresponding to the PDU session.

604: The first access network device sends a first message to the core network device, where the first message carries second indication information and information about the target second access network device.

The second indication information is for indicating that the first access network device does not support the network slice corresponding to the PDU session. It should be understood that, in addition to the second indication information, the first message may further carry the information about the target second access network device, so that the core network device may learn that the network slice corresponding to the PDU session is not supported by the first access network device, but the network slice is supported by the target second access network device.

The core network device receives the first message from the first access network device.

Optionally, in an example, the first message may be an NGAP message.

605: The core network device sends a second message to the first access network device, where the second message includes information about a resource configuration required for establishing the PDU session.

If the first message carries the second indication information and the information about the target second access network device, the core network device sends the second message to the first access network device, where the second message includes the information about the resource configuration required for establishing the PDU session.

Optionally, in an example, the second message may be an NGAP message.

For example, the second message may be a PDU session resource setup request message, and may be represented as a PDU session resource setup request.

Optionally, the information about the target second access network device may include an identifier, transport network layer information, and the like of the target second access network device.

Further, if the first access network device finds the target second access network device as an SN, after the first access network device receives the second message from the core network device, the first access network device adds the target second access network device as the SN, to provide a network slice service for the terminal device in a DC manner, as shown in steps 506 to 511.

606: The first access network device sends an SN addition request message to the target second access network device.

The target second access network device receives the SN addition request message from the first access network device.

607: The target second access network device sends an SN addition acknowledge message to the first access network device.

608: The first access network device sends an RRC connection reconfiguration message to the terminal device, where the RRC connection reconfiguration message is used by the terminal device to access the target second access network device.

The RRC connection reconfiguration message may carry the information about the target second access network device, for example, user plane tunnel address information of the target second access network device.

609: The terminal device receives an RRC reconfiguration message from the target second access network device.

610: The terminal device initiates a random access procedure based on the RRC reconfiguration message, to access the target second access network device.

After accessing the target second access network device, the terminal device continues the PDU session by using the network slice service provided by the target second access network device.

611: The first access network device sends a PDU session resource setup response message to the core network device.

It should be understood that the PDU session resource setup response message is for responding to the PDU session resource setup request message in step 540.

Figure 10:
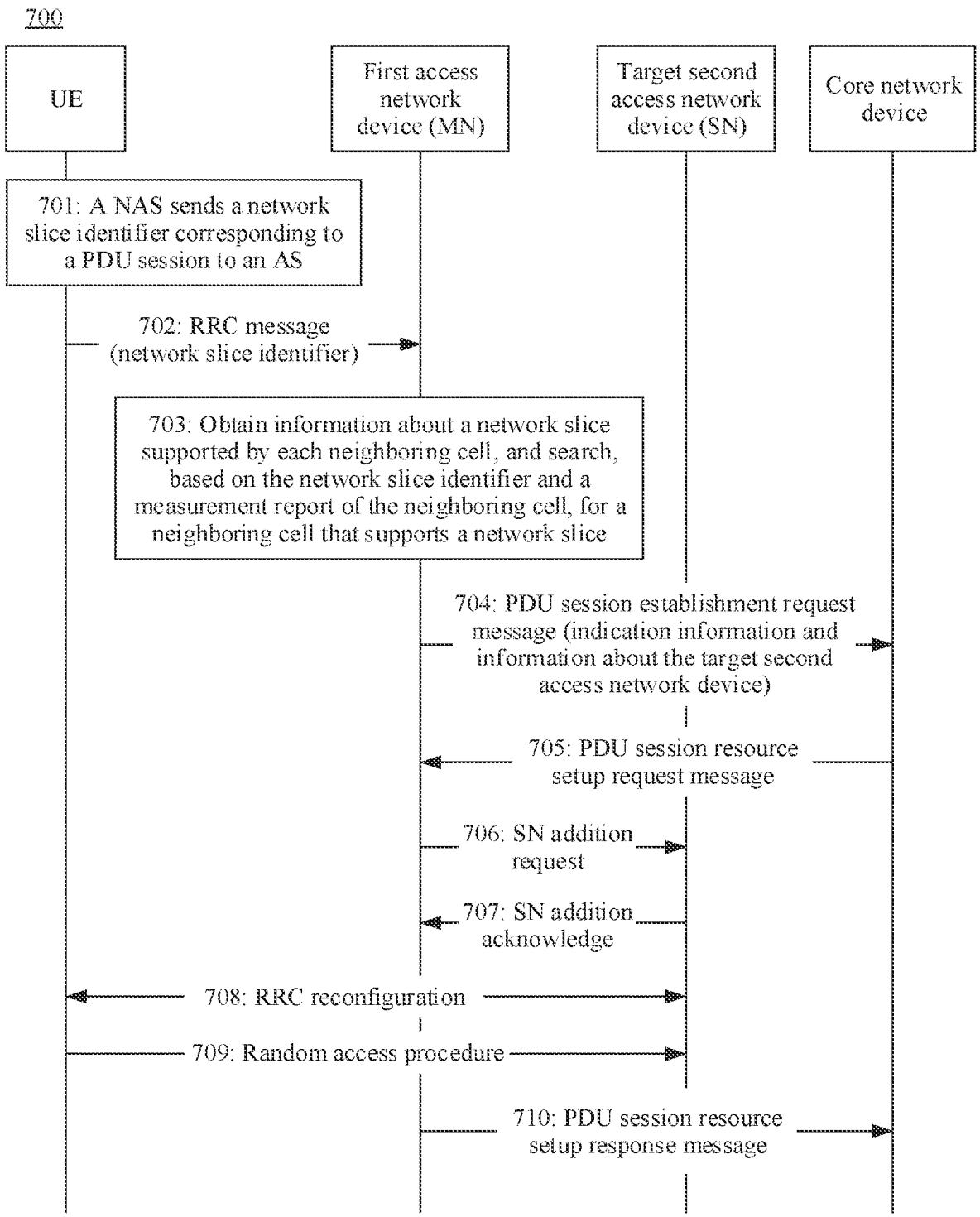
FIG. 10 is an embodiment of providing a network slice according to this application.

FIG. 10 is an embodiment of providing a network slice according to this application.

701: When UE determines that a first access network device currently accessed by the UE does not support a network slice corresponding to an initiated PDU session, a NAS of the UE sends a network slice identifier to an AS.

The AS of the UE receives the network slice identifier from the NAS of the UE.

702: The AS of the UE sends an RRC message to the first access network device, where the RRC message carries the network slice identifier.

703: The first access network device obtains, from a second access network device corresponding to each neighboring cell, information about a network slice supported by each neighboring cell, and searches, based on the network slice identifier and a measurement report of the UE, a neighboring cell that supports the network slice.

In a possible case, the first access network device finds, based on the network slice identifier, the measurement report of the UE, and the information about the network slice supported by each neighboring cell, a target second access network device that can provide the network slice for the UE. In this case, the first access network device performs steps 604 to 610.

- 704: The first access network device forwards, to a core network device, a PDU session establishment request message that is from the UE, where the PDU session establishment request message carries second indication information and information about the target second access network device, and the second indication information is for indicating that the first access network device does not support the network slice.
- 705: The first access network device receives a PDU session resource setup request message from the core network device, where the PDU session resource setup request message includes information about a resource configuration required for establishing the PDU session.
- 706: The first access network device sends an SN addition request message to the target second access network device.

The SN addition request message carries the information about the resource configuration required for establishing the PDU session.

- 707: The first access network device receives an SN addition acknowledge request from the target second access network device.
- 708: The UE receives an RRC reconfiguration message from the target second access network device, where the RRC reconfiguration message carries information required for accessing the target second access network device.
- 709: The UE accesses the target second access network device based on the RRC reconfiguration message.
- 710: The first access network device sends a PDU session resource setup response message to the core network device.

In the foregoing embodiment, through interaction between the NAS and the AS of the terminal device, the AS may notify the access network device of an identifier of the network slice corresponding to the PDU session, so that the access network device may determine in advance whether the access network device and the neighboring cell support the network slice, to notify the core network device when forwarding a PDU session request message to the core network device. Therefore, unnecessary signaling transmission can be avoided.

Figure 11:
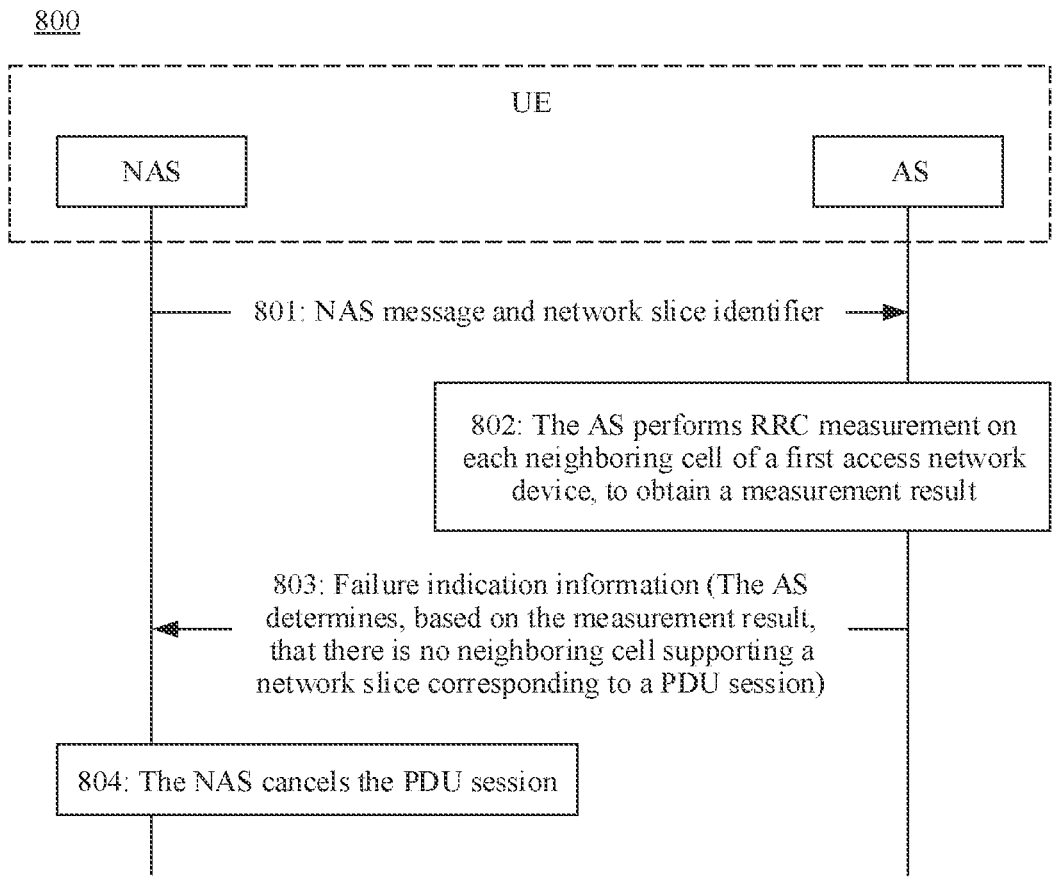
FIG. 11 is an example of canceling a PDU session by UE according to this application.

In the foregoing embodiments, when the UE initiates the PDU session that is not supported by the first access network device, the UE sends, to the first access network device, the network slice identifier corresponding to the PDU session. The first access network device obtains the information about the network slice supported by each neighboring cell, and determines whether there is an appropriate neighboring cell that supports the network slice. If an appropriate neighboring cell is found, the first access network device adds, as an SN, a target second access network device corresponding to the appropriate neighboring cell, and the SN provides a network slice service for the UE. With reference to FIG. 11, the following provides another embodiment. When UE determines that a network slice corresponding to a PDU session is not supported by a first access network device, if the network slice is not supported by a neighboring cell of the first access network device either, the UE cancels initiation of the PDU session.

FIG. 11 is an example of canceling a PDU session by the UE according to this application.

- 801: A NAS of the UE sends a NAS message and a network slice identifier to an AS of the UE.

The NAS message is for requesting to establish a PDU session, and the network slice identifier is for identifying a network slice corresponding to the PDU session.

Optionally, when initiating the PDU session, the NAS of the UE may send the NAS message and the network slice identifier to the AS by default without performing any determining.

In another embodiment, when determining that the first access network device accessed by the UE does not support the network slice corresponding to the PDU session, the NAS sends the NAS message and the network slice identifier to the AS.

Alternatively, in another implementation, in step 701, when determining that the first access network device accessed by the UE does not support the network slice corresponding to the PDU session, the NAS may send only the network slice identifier to the AS.

- 802. When the UE determines that the first access network device does not support the network slice corresponding to the PDU session, the AS of the UE performs RRM measurement on each neighboring cell of the first access network device, to obtain a measurement result.

In step 802, whether the first access network device supports the network slice corresponding to the PDU session may be determined by the AS or the NAS of the UE. This is not limited. If the AS performs determining, the AS triggers RRM measurement when determining that the first access network device does not support the network slice. Alternatively, if the NAS performs determining, the NAS indicates, when determining that the first access network device does not support the network slice, the AS to perform RRM measurement.

Alternatively, as shown in step 701, if the NAS determines that the first access network device does not support the network slice, and sends only the network slice identifier to the AS, the AS triggers RRM measurement after receiving the network slice identifier from the NAS.

The AS performs RRM measurement to obtain the measurement result. Further, the AS may determine, based on the measurement result, whether there is a cell supporting the network slice in the neighboring cell of the first access network device. In a possible case, no neighboring cell of the first access network device supports the network slice requested by the UE, and the AS feeds back failure indication information to the NAS, as shown in step 703.

- 803: The AS of the UE sends the failure indication information to the NAS, where the failure indication information is for indicating that the network slice corresponding to the PDU session is not supported.
- 804: The NAS of the UE cancels the PDU session based on the failure indication information.

Through interaction between the NAS and the AS of the terminal device, when the first access network device does not support the network slice corresponding to the PDU session initiated by the terminal device, the AS autonomously triggers RRM measurement, and determines, based on the measurement result of the RRM measurement, whether there is a neighboring cell supporting the network slice. If no neighboring cell of the first access network device supports the network slice, the AS sends the failure indication information to the NAS, to notify, to the NAS, that the network slice is not supported, so that the NAS may cancel the PDU session. Therefore, unnecessary signaling exchange is avoided.

The foregoing describes in detail the method for providing a network slice in this application, and the following describes communication apparatuses in this application.

Figure 12:
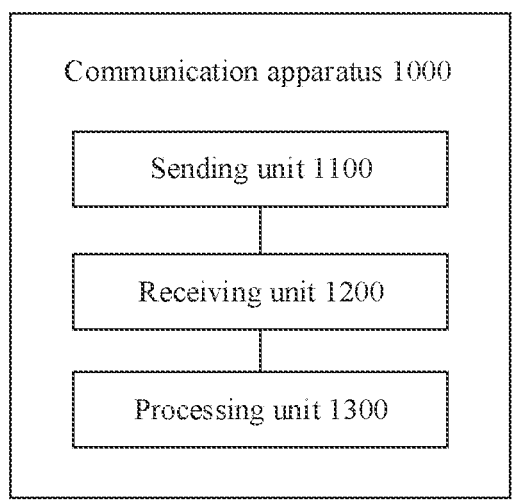
FIG. 12 is a schematic block diagram of a terminal apparatus according to this application.

FIG. 12 is a schematic block diagram of a terminal apparatus according to this application. As shown in FIG. 12, the communication apparatus 1000 includes a sending unit 1100, a receiving unit 1200, and a processing unit 1300.

The sending unit 1100 is configured to send a first RRC message to a first access network device, where the first RRC message includes a NAS message and a network slice identifier, the NAS message is for requesting to establish a PDU session, and the network slice identifier is for identifying a network slice corresponding to the PDU session.

The receiving unit 1200 is configured to receive a second RRC message from the first access network device, where the second RRC message carries information about a target second access network device, the target second access network device supports the network slice, and a cell corresponding to the target second access network device is a neighboring cell of the first access network device.

The processing unit 1300 is further configured to access the target second access network device.

Optionally, the sending unit 1100 and the receiving unit 1200 may also be integrated into a transceiver unit, and have both a receiving function and a sending function. This is not limited herein.

Optionally, in an embodiment, the processing unit 1300 is further configured to obtain, through an AS, information about a network slice supported by the first access network device;

the sending unit 1100 sends, to a NAS through the AS, the information about the network slice supported by the first access network device; and the sending unit 1100 sends, through the NAS, the NAS message and the network slice identifier to the AS w % ben the processing unit 1300 determines, through the NAS, that the network slice belongs to an allowed network slice and that the network slice is not supported by the first access network device.

Optionally, in an embodiment, the sending unit 1100 sends the network slice identifier to an AS through a NAS when the processing unit 1300 determines, through the NAS, that the network slice belongs to an allowed network slice; and the processing unit 1300 is further configured to: obtain, through the AS, information about a network slice supported by the first access network device, and determine, through the AS, that the network slice corresponding to the PDU session is not supported by the first access network device.

Optionally, in an embodiment, the processing unit 1300 obtains, from the first access network device through an AS, information about a network slice supported by the first access network device;

the receiving unit 1200 receives, from a NAS through the AS, the network slice identifier and information about an allowed network slice, where the network slice identifier is for identifying the network slice corresponding to the PDU session initiated by the NAS; and the processing unit 1300 determines, through the AS, that the network slice corresponding to the PDU session belongs to the allowed network slice and that the network slice corresponding to the PDU session is not supported by the first access network device.

Optionally, in an embodiment, the processing unit 1300 is further configured to obtain, from the first access network device through an AS, information about a network slice supported by the first access network device;

the receiving unit 1200 receives, from a NAS through the AS, the network slice identifier and information about an allowed network slice, where the network slice identifier is for identifying the network slice corresponding to the PDU session initiated by the NAS; and the processing unit 1300 determines, through the AS, that the network slice corresponding to the PDU session belongs to the allowed network slice and that the network slice corresponding to the PDU session is not supported by the first access network device.

Optionally, in an embodiment, the sending unit 1100 sends the NAS message and the network slice identifier to an AS through a NAS; and the sending unit 1100 is further configured to send the first RRC message to the first access network device through the AS.

Optionally, in an embodiment, the processing unit 1300 is further configured to obtain, through the AS, information about a network slice supported by the target second access network device; and the sending unit 1100 is further configured to send, to the NAS through the AS, the information about the network slice supported by the target second access network device.

Optionally, in an embodiment, the processing unit 1300 is further configured to perform RRM measurement through the AS when determining that the first access network device does not support the network slice corresponding to the PDU session, or the processing unit 1300 indicates, through the NAS when determining that the first access network device does not support the network slice corresponding to the PDU session, the AS to perform RRM measurement, to obtain a measurement result, where the measurement result includes information about a network slice supported by each neighboring cell of the first access network device; and the sending unit 1100 is further configured to send the measurement result to the first access network device through the AS.

Optionally, in an embodiment, the receiving unit 1200 is further configured to receive a registration complete message from a core network device, where the registration complete message carries first indication information, and the first indication information is for indicating the NAS of the communication apparatus to send, to the AS when the NAS initiates a PDU session, an identifier of a network slice corresponding to the PDU session.

Optionally, in an embodiment, the sending unit 1100 is configured to send a NAS message and a network slice identifier to an AS of the communication apparatus through a NAS, where the NAS message is for requesting to establish a PDU session, and the network slice identifier is for identifying a network slice corresponding to the PDU session:

the processing unit 1300 is configured to: perform RRM measurement through the AS when determining that a first access network device accessed by the communication apparatus does not support the network slice corresponding to the PDU session; or indicate, through the NAS when determining that the first access network device does not support the network slice corresponding to the PDU session, the AS to perform RRM measurement, to obtain a measurement result, where the measurement result includes information about a network slice supported by each neighboring cell of the first access network device;

the processing unit 1300 is further configured to: w % ben determining, through the AS based on the measurement result, that no neighboring cell supports the network slice corresponding to the PDU session, control the sending unit 1100 to send failure indication information to the NAS through the AS, where the failure indication information is for indicating that the network slice is not supported; and the processing unit 1300 is further configured to cancel initiation of the PDU session based on the failure indication information through the NAS.

In an implementation, the communication apparatus 1000 may be the terminal device in the method embodiments. In this implementation, the sending unit 1100 may be a transmitter, and the receiving unit 1200 may be a receiver. Alternatively, the receiver and the transmitter may be integrated into a transceiver. The processing unit 1300 may be a processing apparatus.

In another implementation, the communication apparatus 1000 may be a chip or an integrated circuit installed in the terminal device. In this implementation, the sending unit 1100 and the receiving unit 1200 may be a communication interface or an interface circuit. For example, the sending unit 1100 is an output interface or an output circuit, the receiving unit 1200 is an input interface or an input circuit, and the processing unit 1300 may be a processing apparatus.

A function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, so that the communication apparatus 1000 performs operations and/or processing performed by the terminal device in the method embodiments. Optionally, the processing apparatus may include only the processor, and the memory configured to store the computer program is located outside the processing apparatus. The processor is connected to the memory by using a circuit/wire to read and execute the computer program stored in the memory. For another example, the processing apparatus may be a chip or an integrated circuit.

Figure 13:
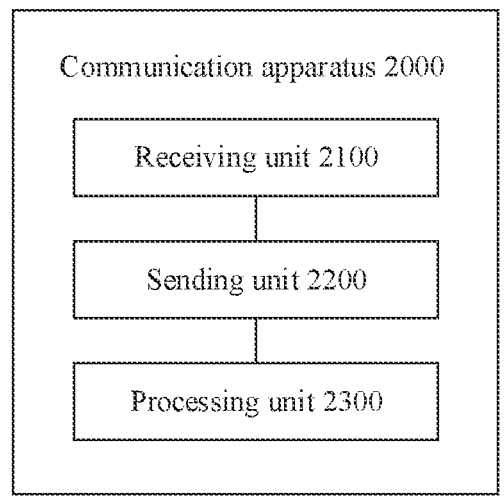
FIG. 13 is a schematic block diagram of another communication apparatus according to this application.

FIG. 13 is a schematic block diagram of another communication apparatus according to this application. As shown in FIG. 13, the communication apparatus 2000 includes a receiving unit 2100, a sending unit 2200, and a processing unit 2300.

The receiving unit 2100 is configured to receive a first RRC message from a terminal device, where the first RRC message includes a NAS message and a network slice identifier, the NAS message is for requesting to establish a PDU session, and the network slice identifier is for identifying a network slice corresponding to the PDU session.

The sending unit 2200 is configured to send a first message to a core network device, where the first message carries second indication information, and the second indication information is for indicating that a first access network device does not support the network slice.

Optionally, the receiving unit 2100 and the sending unit 2200 may also be integrated into a transceiver unit, and have both a receiving function and a sending function. This is not limited herein.

Optionally, in an embodiment, the first message further carries information about a target second access network device, the target second access network device supports the network slice corresponding to the PDU session, and a cell corresponding to the target second access network device is a neighboring cell of the first access network device.

Optionally, in an embodiment, the receiving unit 2100 is further configured to receive a measurement result from the terminal device, where the measurement result includes information about a network slice supported by each neighboring cell of the first access network device; and the communication apparatus further includes:

the processing unit 2300, configured to determine, based on the measurement result, that no neighboring cell supports the network slice.

Optionally, in an embodiment, the receiving unit 2100 is further configured to receive a measurement result from the terminal device, where the measurement result includes information about a network slice supported by each neighboring cell of the first access network device; and the processing unit 2300 is further configured to determine, based on the measurement result, that the target second access network device supports the network slice corresponding to the PDU session, where the cell corresponding to the target second access network device is a neighboring cell of the first access network device.

In some other solutions, the units of the communication apparatus 2000 are further configured to perform the following steps and/or operations.

In an embodiment, the receiving unit 2100 is configured to receive first information from the core network device, where the first information is for indicating one or more second access network devices, the one or more second access network devices support a network slice corresponding to a PDU session that the terminal device requests to establish, and the first access network device does not support the network slice; and the processing unit 2300 is configured to select a target second access network device from the one or more second access network devices based on the first information.

Optionally, in an embodiment, the first information includes any one or more of the following information about a neighboring cell of the first access network device:

a PCI list, where the PCI list includes one or more PCIs, and a cell corresponding to each PCI supports the network slice;

a CGI list, where the CGI list includes one or more CGIs, and a cell corresponding to each CGI supports the network slice;

a PCI list and an identifier of a second access network device associated with each PCI in the PCI list, where the second access network device associated with each PCI supports the network slice;

identifiers of the one or more second access network devices, where each second access network device supports the network slice;

a RAN AC list, where a cell corresponding to each RAN AC in the RAN AC list supports the network slice;

a CAG ID list, where a cell corresponding to each CAG ID in the CAG ID list supports the network slice;

an RSA ID list, where a cell corresponding to each RSA ID in the RSA ID list supports the network slice;

carrier information, where the carrier information includes one or more carriers, and each carrier supports the network slice corresponding to the PDU session; or carrier information and cell information, where the carrier information includes one or more carriers, and each carrier supports the network slice corresponding to the PDU session.

Optionally, in some embodiments, a sequence of PCIs included in the PCI list indicates a priority sequence of cells corresponding to the PCIs in the PCI list;

a sequence of CGIs included in the CGI list indicates a priority sequence of cells corresponding to the CGIs in the CGI list;

a sequence of identifiers of second access network devices indicates a priority sequence of the second access network devices;

a sequence of RAN ACs included in the RAN AC list indicates a priority sequence of cells corresponding to the RAN ACs in the RAN AC list;

a sequence of CAG IDs included in the CAG ID list indicates a priority sequence of cells corresponding to the CAG IDs in the CAG ID list;

a sequence of RSA IDs included in the RSA ID list indicates a priority sequence of cells corresponding to the RSA IDs in the RSA ID list; or a sequence of carriers included in the carrier information indicates a priority sequence of the carriers.

In an implementation, the communication apparatus 2000 may be the first access network device in the method embodiments. In this implementation, the receiving unit 2100 may be a receiver, and the sending unit 2200 may be a transmitter. Alternatively, the receiver and the transmitter may be integrated into a transceiver. The processing unit 2300 may be a processing apparatus.

In another implementation, the communication apparatus 2000 may be a chip or an integrated circuit installed in the first access network device. In this implementation, the receiving unit 2100 and the sending unit 2200 may be a communication interface or an interface circuit. For example, the receiving unit 2100 is an input interface or an input circuit, the sending unit 2200 is an output interface or an output circuit, and the processing unit 2300 may be a processing apparatus.

A function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, so that the communication apparatus 2000 performs operations and/or processing performed by the first access network device in the method embodiments. Optionally, the processing apparatus may include only the processor, and the memory configured to store the computer program is located outside the processing apparatus. The processor is connected to the memory by using a circuit/wire to read and execute the computer program stored in the memory. For another example, the processing apparatus may be a chip or an integrated circuit.

Figure 14:
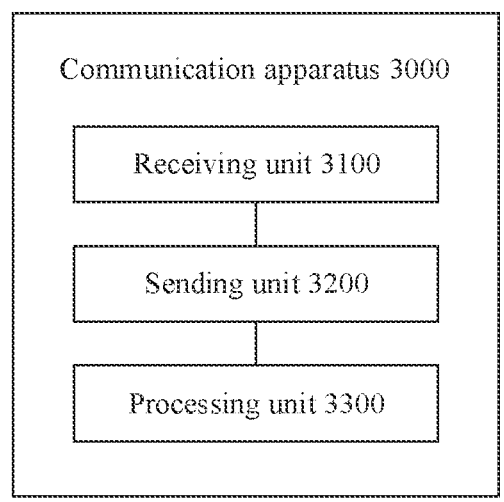
FIG. 14 is a schematic block diagram of another communication apparatus according to this application.

FIG. 14 is a schematic block diagram of another communication apparatus according to this application. As shown in FIG. 14, the communication apparatus 3000 includes a receiving unit 3100 and a sending unit 3200.

The receiving unit 3100 is configured to receive a first message from a first access network device, where the first message carries second indication information and information about a target second access network device, the first message is for requesting to establish a PDU session, the second indication information is for indicating that the first access network device does not support a network slice corresponding to the PDU session, the target second access network device supports the network slice corresponding to the PDU session, and a cell corresponding to the target second access network device is a neighboring cell of the first access network device.

The sending unit 3200 is configured to send a second message to the first access network device, where the second message includes information about a resource configuration required for establishing the PDU session.

Optionally, the receiving unit 3100 and the sending unit 3200 may also be integrated into a transceiver unit, and have both a receiving function and a sending function. This is not limited herein.

Optionally, in an embodiment, the receiving unit 3100 is further configured to receive a registration request message from a terminal device, where the registration request message is for requesting to register the terminal device with a core network; and the sending unit 3200 is further configured to send a registration complete message to the terminal device, where the registration complete message carries first indication information, and the first indication information is for indicating a NAS of the terminal device to send, to an AS when the NAS initiates a PDU session, an identifier of a network slice corresponding to the PDU session.

In some other solutions, the units of the communication apparatus 3000 further have the following functions.

Optionally, in an embodiment, the receiving unit 3100 is configured to receive a PDU session establishment request message from the terminal device, where the PDU session establishment request message carries a network slice identifier, the PDU session establishment request message is for requesting to establish a PDU session, the network slice identifier is for identifying a network slice corresponding to the PDU session, and the first access network device accessed by the terminal device does not support the network slice; and the sending unit 3200 is configured to send first information to the first access network device, where the first information is for indicating one or more second access network devices that support the network slice.

Optionally, in an embodiment, the communication apparatus 3000 further includes: a processing unit 3300, configured to determine, based on a network slice supported by the first access network device, that the first access network device does not support the network slice.

Optionally, in some embodiments, the first information includes any one or more of the following information about a neighboring cell of the first access network device:

a PCI list, where the PCI list includes one or more PCIs, and a cell corresponding to each PCI supports the network slice;

a CGI list, where the CGI list includes one or more CGIs, and a cell corresponding to each CGI supports the network slice;

a PCI list and an identifier of a second access network device associated with each PCI in the PCI list, where the second access network device associated with each PCI supports the network slice;

identifiers of the one or more second access network devices, where each second access network device supports the network slice;

a RAN AC list, where a cell corresponding to each RAN AC in the RAN AC list supports the network slice;

a CAG ID list, where a cell corresponding to each CAG ID in the CAG ID list supports the network slice;

an RSA ID list, where a cell corresponding to each RSA ID in the RSA ID list supports the network slice;

carrier information, where the carrier information includes one or more carriers, and each carrier supports the network slice corresponding to the PDU session; or carrier information and cell information, where the carrier information includes one or more carriers, and each carrier supports the network slice corresponding to the PDU session.

Optionally, in an implementation, a sequence of PCIs included in the PCI list indicates a priority sequence of cells corresponding to the PCIs in the PCI list;

a sequence of CGIs included in the CGI list indicates a priority sequence of cells corresponding to the CGIs in the CGI list;

a sequence of identifiers of second access network devices indicates a priority sequence of the second access network devices;

a sequence of RAN ACs included in the RAN AC list indicates a priority sequence of cells corresponding to the RAN ACs in the RAN AC list;

a sequence of CAG IDs included in the CAG ID list indicates a priority sequence of cells corresponding to the CAG IDs in the CAG ID list;

a sequence of RSA IDs included in the RSA ID list indicates a priority sequence of cells corresponding to the RSA IDs in the RSA ID list; or a sequence of carriers included in the carrier information indicates a priority sequence of the carriers.

In an implementation, the communication apparatus 3000 may be the core network device in the method embodiments. In this implementation, the receiving unit 3100 may be a receiver, and the sending unit 3200 may be a transmitter. Alternatively, the receiver and the transmitter may be integrated into a transceiver. The processing unit 3300 may be a processing apparatus.

In another implementation, the communication apparatus 3000 may be a chip or an integrated circuit installed in the core network device. In this implementation, the receiving unit 3100 and the sending unit 3200 may be a communication interface or an interface circuit. For example, the receiving unit 3100 is an input interface or an input circuit, the sending unit 3200 is an output interface or an output circuit, and the processing unit 3300 may be a processing apparatus.

A function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, so that the communication apparatus 3000 performs operations and/or processing performed by the core network device in the method embodiments. Optionally, the processing apparatus may include only the processor, and the memory configured to store the computer program is located outside the processing apparatus. The processor is connected to the memory by using a circuit/wire to read and execute the computer program stored in the memory. For another example, the processing apparatus may be a chip or an integrated circuit.

Figure 15:
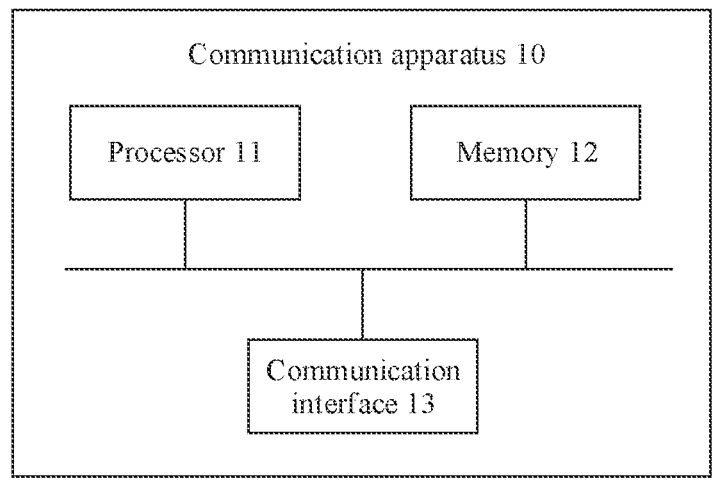
FIG. 15 is a schematic diagram of a structure of a communication apparatus 10 according to this application.

FIG. 15 is a schematic diagram of a structure of a communication apparatus 10 according to this application. As shown in FIG. 15, the communication apparatus 10 includes one or more processors 11, one or more memories 12, and one or more communication interfaces 13. The processor 11 is configured to control the communication interface 13 to receive and send signals. The memory 12 is configured to store a computer program. The processor 11 is configured to invoke the computer program from the memory 12 and run the computer program, so that procedures and/or operations performed by the terminal device in the method embodiments of this application are performed.

For example, the processor 11 may have a function of the processing unit 1300 shown in FIG. 12, and the communication interface 13 may have a function of the sending unit 1100 and/or the receiving unit 1200 shown in FIG. 12. Specifically, the processor 11 may be configured to perform processing or operations internally performed by the terminal device in FIG. 6 to FIG. 11, and the communication interface 13 is configured to perform sending actions and/or receiving actions performed by the terminal device in FIG. 6 to FIG. 11.

In an implementation, the communication apparatus 10 may be the terminal device in the method embodiments. In this implementation, the communication interface 13 may be a transceiver. The transceiver may include a receiver and a transmitter.

Optionally, the processor 11 may be a baseband apparatus, and the communication interface 13 may be a radio frequency apparatus.

In another implementation, the communication apparatus 10 may be a chip installed in the terminal device. In this implementation, the communication interface 13 may be an interface circuit or an input/output interface.

Figure 16:
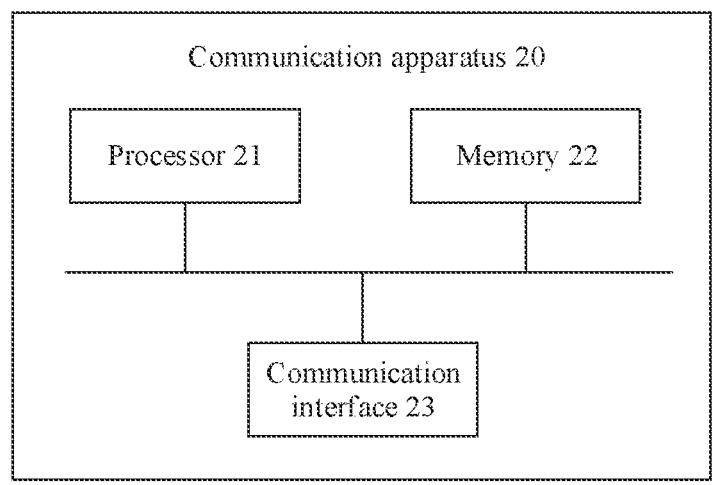
FIG. 16 is a schematic diagram of a structure of a communication apparatus 20 according to this application.

FIG. 16 is a schematic diagram of a structure of a communication apparatus 20 according to this application. As shown in FIG. 16, the communication apparatus 20 includes one or more processors 21, one or more memories 22, and one or more communication interfaces 23. The processor 21 is configured to control the communication interface 23 to receive and send signals. The memory 22 is configured to store a computer program. The processor 21 is configured to invoke the computer program from the memory 22 and run the computer program, so that procedures and/or operations performed by the first access network device in the method embodiments of this application are performed.

For example, the processor 21 may have a function of the processing unit 2300 shown in FIG. 13, and the communication interface 23 may have functions of the receiving unit 2100 and the sending unit 2200 shown in FIG. 13. Specifically, the processor 21 may be configured to perform processing or operations internally performed by the first access network device in FIG. 6 to FIG. 11, and the communication interface 23 is configured to perform sending actions and/or receiving actions performed by the first access network device in FIG. 6 to FIG. 11. Details are not described again.

Figure 17:
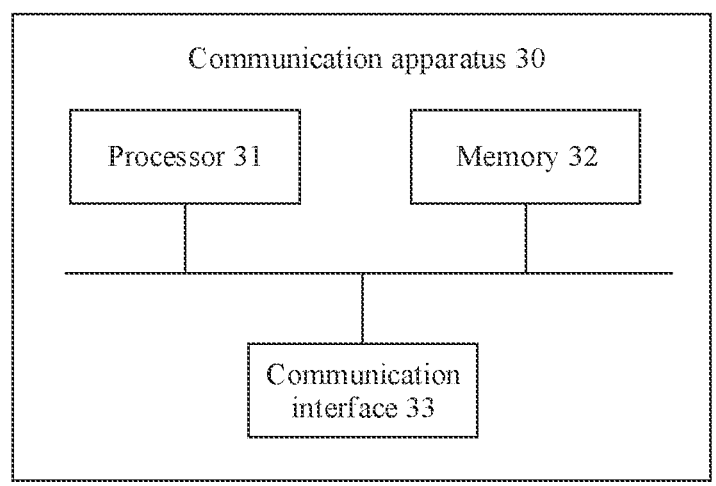
FIG. 17 is a schematic diagram of a structure of a communication apparatus 30 according to this application.

FIG. 17 is a schematic diagram of a structure of a communication apparatus 30 according to this application. As shown in FIG. 17, the communication apparatus 30 includes one or more processors 31, one or more memories 32, and one or more communication interfaces 33. The processor 31 is configured to control the communication interface 33 to receive and send signals. The memory 32 is configured to store a computer program. The processor 31 is configured to invoke the computer program from the memory 32 and run the computer program, so that procedures and/or operations performed by the core network device in the method embodiments of this application are performed.

For example, the processor 31 may have a function of the processing unit 3300 shown in FIG. 14, and the communication interface 33 may have functions of the receiving unit 3100 and the sending unit 3200 shown in FIG. 14. Specifically, the processor 31 may be configured to perform processing or operations internally performed by the core network device in FIG. 6 to FIG. 11, and the communication interface 33 is configured to perform sending actions and/or receiving actions performed by the core network device in FIG. 6 to FIG. 11. Details are not described again.

Optionally, the memory and the memory in the foregoing apparatus embodiments may be physically independent units, or the memory may be integrated with the processor. This is not limited in this specification.

In addition, this application further provides a computer-readable storage medium. The computer-readable storage medium stores computer instructions. When the computer instructions are run on a computer, operations and/or procedures performed by the terminal device in the method embodiments of this application are performed.

This application further provides a computer-readable storage medium. The computer-readable storage medium stores computer instructions. When the computer instructions are run on a computer, operations and/or procedures performed by the first access network device in the method embodiments of this application are performed.

This application further provides a computer-readable storage medium. The computer-readable storage medium stores computer instructions. When the computer instructions are run on a computer, operations and/or procedures performed by the core network device in the method embodiments of this application are performed.

This application further provides a computer program product. The computer program product includes computer program code or instructions. When the computer program code or the instructions are run on a computer, operations and/or procedures performed by the terminal device in the method embodiments of this application are performed.

This application further provides a computer program product. The computer program product includes computer program code or instructions. When the computer program code or the instructions are run on a computer, operations and/or procedures performed by the first access network device in the method embodiments of this application are performed.

This application further provides a computer program product. The computer program product includes computer program code or instructions. When the computer program code or the instructions are run on a computer, operations and/or procedures performed by the core network device in the method embodiments of this application are performed.

In addition, this application further provides a chip. The chip includes a processor. A memory configured to store a computer program is disposed independent of the chip. The processor is configured to execute the computer program stored in the memory, to perform operations and/or processing performed by the terminal device in any method embodiment.

Further, the chip may include a communication interface. The communication interface may be an input/output interface, an interface circuit, or the like. Further, the chip may include the memory.

In addition, this application further provides a chip. The chip includes a processor. A memory configured to store a computer program is disposed independent of the chip. The processor is configured to execute the computer program stored in the memory, to perform operations and/or processing performed by the terminal device in any method embodiment.

Further, the chip may include a communication interface. The communication interface may be an input/output interface, an interface circuit, or the like. Further, the chip may include the memory.

This application further provides a chip. The chip includes a processor. A memory configured to store a computer program is disposed independent of the chip. The processor is configured to execute the computer program stored in the memory, to perform operations and/or processing performed by the first access network device in any method embodiment.

Further, the chip may include a communication interface. The communication interface may be an input/output interface, an interface circuit, or the like. Further, the chip may include the memory.

This application further provides a chip. The chip includes a processor. A memory configured to store a computer program is disposed independent of the chip. The processor is configured to execute the computer program stored in the memory, to perform operations and/or processing performed by the core network device in any method embodiment.

Further, the chip may include a communication interface. The communication interface may be an input/output interface, an interface circuit, or the like. Further, the chip may include the memory.

In addition, this application further provides a wireless communication system, including all or a part of the terminal device, the first access network device, and the core network device in embodiments of this application.

The processor in embodiments of this application may be an integrated circuit chip, and has a signal processing capability. In an implementation process, the steps in the foregoing method embodiments may be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like. The steps of the methods disclosed with reference to embodiments of this application may be directly performed and completed by a hardware encoding processor, or may be performed and completed by using a combination of hardware in the encoding processor and a software module. The software module may be located in a mature storage medium in the art, for example, a random access memory, a flash memory, a read-only memory, a programmable read-only memory, an electrically erasable programmable memory, or a register. The storage medium is located in a memory, and the processor reads information in the memory and completes the steps of the methods in combination with the hardware of the processor.

In embodiments of this application, the memory may be a volatile memory or a nonvolatile memory, or may include both the volatile memory and the nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that the memory of the system and method described in this specification includes but is not limited to these and any memory of another appropriate type.

A person of ordinary skill in the art may be aware that, in combination with the units and algorithm steps in the examples described in the embodiments disclosed in this specification, this application can be implemented by using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located at one position, or may be distributed on a plurality of network units. Some or all of the units may be selected based on an actual requirement to achieve the objectives of the solutions of embodiments.

In addition, function units in embodiments of this application may be integrated into one processing unit, or each of the units may exist alone physically, or two or more units may be integrated into one unit.

The term "and/or" in this application describes only an association relationship for describing associated objects and represents that there may be three relationships. For example, A and/or B may represent the following three cases: Only A exists, both A and B exist, and only B exists. A, B, and C each may be singular or plural. This is not limited.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for providing a network slice, comprising:
   sending, by a terminal device, a first radio resource control (RRC) message to a first access network device, wherein the first RRC message comprises a non-access stratum (NAS) message and a network slice identifier, the NAS message is for requesting to establish a protocol data unit (PDU) session, and the network slice identifier is for identifying a network slice corresponding to the PDU session;
   receiving, by the terminal device, a second RRC message from the first access network device, wherein the second RRC message carries information about a target second access network device, the first access network device does not support the network slice, the target second access network device supports the network slice, and a cell corresponding to the target second access network device is a neighboring cell of the first access network device; and
   accessing, by the terminal device, the target second access network device.

2. The method according to claim 1, wherein before sending the first RRC message to the first access network device, the method further comprises:
   obtaining, by an access stratum (AS) of the terminal device, information about a network slice supported by the first access network device;
   sending, by the AS of the terminal device to a NAS of the terminal device, the information about the network slice supported by the first access network device; and
   sending, by the NAS of the terminal device, the NAS message and the network slice identifier to the AS when the NAS of the terminal device determines that the network slice belongs to an allowed network slice and that the network slice is not supported by the first access network device.

3. The method according to claim 1, wherein before sending the first RRC message to the first access network device, the method further comprises:
   sending, by a NAS of the terminal device, the network slice identifier to an access stratum (AS) of the terminal device when the network slice belongs to an allowed network slice; and
   obtaining, by the AS of the terminal device, information about a network slice supported by the first access network device, and determining that the network slice corresponding to the PDU session is not supported by the first access network device.

4. The method according to claim 1, wherein before sending the first RRC message to the first access network device, the method further comprises:
   obtaining, by an access stratum (AS) of the terminal device from the first access network device, information about a network slice supported by the first access network device;
   receiving, by the AS of the terminal device from a NAS, the network slice identifier and information about an allowed network slice, wherein the network slice identifier is for identifying the network slice corresponding to the PDU session initiated by the NAS; and
   determining, by the AS of the terminal device, that the network slice corresponding to the PDU session belongs to the allowed network slice and that the network slice corresponding to the PDU session is not supported by the first access network device.

5. The method according to claim 1, wherein before sending the first RRC message to the first access network device, the method further comprises:
   sending, by a NAS of the terminal device, the NAS message and the network slice identifier to an access stratum (AS) of the terminal device; and
   wherein sending the first RRC message to the first access network device comprises:
      sending, by the AS of the terminal device, the first RRC message to the first access network device.

6. The method according to claim 1, wherein after accessing the target second access network device, the method further comprises:
   obtaining, by an access stratum (AS) of the terminal device, information about a network slice supported by the target second access network device; and
   sending, by the AS of the terminal device to a NAS, the information about the network slice supported by the target second access network device.

7. The method according to claim 1, wherein before receiving the second RRC message from the first access network device, the method further comprises:
   performing, by an access stratum (AS) of the terminal device, radio resource management (RRM) measurement, when determining that the first access network device does not support the network slice corresponding to the PDU session, to obtain a measurement result; or
   indicating, by a NAS of the terminal device when determining that the first access network device does not support the network slice corresponding to the PDU session, the AS to perform RRM measurement to obtain a measurement result, wherein the measurement result comprises information about a network slice supported by each neighboring cell of the first access network device; or
   reporting, by the AS, a historical measurement report when determining that the first access network device does not support the network slice corresponding to the PDU session; or
   indicating, by the NAS when determining that the first access network device does not support the network slice corresponding to the PDU session, the AS to report a historical measurement report; and
   sending, by the AS of the terminal device, the measurement result or the historical measurement report to the first access network device.

8. The method according to claim 1, wherein the method further comprises:
   receiving, by the terminal device, a registration complete message from a core network device, wherein the registration complete message carries first indication information, and the first indication information is for indicating the NAS of the terminal device to send, to the AS when the NAS initiates a PDU session, an identifier of a network slice corresponding to the PDU session.

9. The method according to claim 1, wherein the terminal device includes the network slice identifier in the first RRC message based on the terminal device determining that the first access network device does not support the network slice.

10. A communication apparatus, comprising:
    a transmitter, the transmitter configured to send a first radio resource control (RRC) message to a first access network device, wherein the first RRC message comprises a non-access stratum (NAS) message and a network slice identifier, the NAS message is for requesting to establish a protocol data unit (PDU) session, and the network slice identifier is for identifying a network slice corresponding to the PDU session;
    a receiver, the receiver configured to receive a second RRC message from the first access network device, wherein the second RRC message carries information about a target second access network device, the first access network device does not support the network slice, the target second access network device supports the network slice, and a cell corresponding to the target second access network device is a neighboring cell of the first access network device;
    at least one processor; and
    one or more memories coupled to the at least one processor and storing programming instructions for execution by the at least one processor to access the target second access network device.

11. The communication apparatus according to claim 10, wherein the programming instructions are for execution by the at least one processor to obtain, through an access stratum (AS), information about a network slice supported by the first access network device;
    wherein the transmitter sends, to a NAS through the AS, the information about the network slice supported by the first access network device; and
    wherein the transmitter sends, through the NAS, the NAS message and the network slice identifier to the AS when the at least one processor determines, through the NAS, that the network slice belongs to an allowed network slice and that the network slice is not supported by the first access network device.

12. The communication apparatus according to claim 10, wherein the transmitter is further configured to send the network slice identifier to an access stratum (AS) through a NAS when the at least one processor determines, through the NAS, that the network slice belongs to an allowed network slice; and
    wherein the programming instructions are for execution by the at least one processor to obtain, through the AS, information about a network slice supported by the first access network device, and determine, through the AS, that the network slice corresponding to the PDU session is not supported by the first access network device.

13. The communication apparatus according to claim 10, wherein the at least one processor obtains, from the first access network device through an access stratum (AS), information about a network slice supported by the first access network device;
- wherein the receiver receives, from a NAS through the AS, the network slice identifier and information about an allowed network slice, wherein the network slice identifier is for identifying the network slice corresponding to the PDU session initiated by the NAS; and
- wherein the at least one processor determines, through the AS, that the network slice corresponding to the PDU session belongs to the allowed network slice and that the network slice corresponding to the PDU session is not supported by the first access network device.

14. The communication apparatus according to claim 10, wherein the transmitter sends the NAS message and the network slice identifier to an access stratum (AS through) a NAS; and
- wherein the transmitter is further configured to send the first RRC message to the first access network device through the AS.

15. The communication apparatus according to claim 10, wherein the programming instructions are for execution by the at least one processor to obtain, through an access stratum (AS), information about a network slice supported by the target second access network device; and
- wherein the transmitter is further configured to send, to a NAS through the AS, the information about the network slice supported by the target second access network device.

16. The communication apparatus according to claim 10, wherein the programming instructions are for execution by the at least one processor to:
- perform radio resource management (RRM) measurement, through an access stratum (AS) when determining that the first access network device does not support the network slice corresponding to the PDU session, to obtain a measurement result; or
- indicates, through a NAS when determining that the first access network device does not support the network slice corresponding to the PDU session, the AS to perform RRM measurement to obtain a measurement result, wherein the measurement result comprises information about a network slice supported by each neighboring cell of the first access network device; or
- indicate, through the AS or the NAS when determining that the first access network device does not support the network slice corresponding to the PDU session, the transmitter to send a historical measurement report through the AS; and
- wherein the transmitter is further configured to send the measurement result or the historical measurement report to the first access network device through the AS.

17. The communication apparatus according to claim 10, wherein the receiver is further configured to receive a registration complete message from a core network device, the registration complete message carries first indication information, and the first indication information is for indicating the NAS of the communication apparatus to send, to the AS when the NAS initiates a PDU session, an identifier of a network slice corresponding to the PDU session.

18. A communication apparatus, comprising:
- a receiver, the receiver configured to receive a first radio resource control (RRC) message from a terminal device, wherein the first RRC message comprises a non-access stratum (NAS) message and a network slice identifier, the NAS message is for requesting to establish a protocol data unit (PDU) session, and the network slice identifier is for identifying a network slice corresponding to the PDU session;
- at least one processor;
- at least one memory coupled to the at least one processor and storing programming instructions for execution by the at least one processor to determine that the communication apparatus does not support the network slice based on the first RRC message; and
- a transmitter, the transmitter configured to send a first message to a core network device, wherein the first message carries second indication information, and the second indication information is for indicating that the communication apparatus does not support the network slice.

19. The communication apparatus according to claim 18, wherein the first message further carries information about a target second access network device, the target second access network device supports the network slice, and a cell corresponding to the target second access network device is a neighboring cell of the communication apparatus.

20. The communication apparatus according to claim 19, wherein the receiver is further configured to receive a measurement result or a historical measurement report from the terminal device, wherein the measurement result comprises information about a network slice supported by each neighboring cell of the communication apparatus; and
- wherein the programming instructions are for execution by the at least one processor to determine, based on the measurement result or the historical measurement report, that the target second access network device supports the network slice corresponding to the PDU session, and wherein the cell corresponding to the target second access network device is a neighboring cell of the communication apparatus.

* * * * *